United States Patent
Brown

(10) Patent No.: US 9,491,444 B2
(45) Date of Patent: Nov. 8, 2016

(54) AUTO-MULTISCOPIC 3D DISPLAY SYSTEM

(71) Applicant: Kedrick F. Brown, Houston, TX (US)

(72) Inventor: Kedrick F. Brown, Houston, TX (US)

( * ) Notice: Subject to any disclaimer, the term of this patent is extended or adjusted under 35 U.S.C. 154(b) by 0 days.

(21) Appl. No.: 15/167,489

(22) Filed: May 27, 2016

(65) Prior Publication Data
US 2016/0277727 A1    Sep. 22, 2016

(51) Int. Cl.
*H04N 13/04* (2006.01)

(52) U.S. Cl.
CPC ........ *H04N 13/0409* (2013.01); *H04N 13/042* (2013.01); *H04N 13/0418* (2013.01); *H04N 13/0422* (2013.01)

(58) Field of Classification Search
CPC .................................................. H04N 13/0409
See application file for complete search history.

(56) References Cited

U.S. PATENT DOCUMENTS

| | | | | |
|---|---|---|---|---|
| 6,189,246 B1 * | 2/2001 | Gorthala | ................... | G09F 7/06 40/427 |
| 6,837,585 B2 | 1/2005 | Roggatz | | |
| 7,136,031 B2 * | 11/2006 | Lee | ................... | H04N 13/0404 345/31 |
| 7,483,215 B2 * | 1/2009 | Raymond | .......... | G02B 27/2214 359/627 |
| 7,573,491 B2 | 8/2009 | Hartkop et al. | | |
| 7,752,792 B2 | 7/2010 | Hsieh et al. | | |
| 7,978,407 B1 * | 7/2011 | Connor | ............... | G02B 27/2214 348/54 |
| 8,427,528 B2 | 4/2013 | Saishu et al. | | |
| 8,749,722 B2 | 6/2014 | Uehara | | |
| 8,823,641 B2 | 9/2014 | Kuhlman et al. | | |
| 9,146,403 B2 | 9/2015 | Lanman et al. | | |
| 2004/0001139 A1 * | 1/2004 | Kobayashi | ......... | G02B 27/2214 348/59 |
| 2010/0283838 A1 * | 11/2010 | Tomisawa | .......... | G02B 27/0093 348/51 |
| 2013/0321776 A1 | 12/2013 | Loong | | |
| 2014/0003762 A1 | 1/2014 | Macnamara | | |
| 2014/0362314 A1 * | 12/2014 | Guo | ................... | G02B 27/2214 349/15 |

* cited by examiner

*Primary Examiner* — Dave Czekaj
*Assistant Examiner* — Shanika Brumfield
(74) *Attorney, Agent, or Firm* — Louis Ventre, Jr.

(57) ABSTRACT

A display system enables auto-multiscopic 3D viewing of both static images and video productions. It includes a parallax barrier defining a front surface of the display system. The parallax barrier is non-transparent except for an array of transparent spots or holes. A transparent OLED display is located behind the parallax barrier. It has color pixels and an array of clear spots aligned with the array of transparent spots. The transparent OLED display sends light away from the viewer towards an array of concave mirrors, one for each transparent spot. Each concave mirror reflects the light back through the alignment of clear spot with transparent spot and out into the space in front of the display system. Each concave mirror may be part of an enclosure that surrounds the transparent spot, in order to prevent light originating in one enclosure from being reflected off the concave mirror in another enclosure.

11 Claims, 17 Drawing Sheets

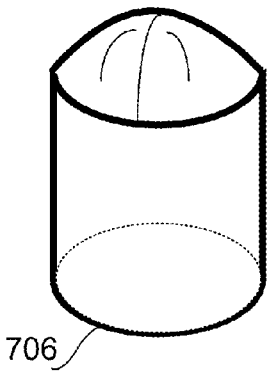
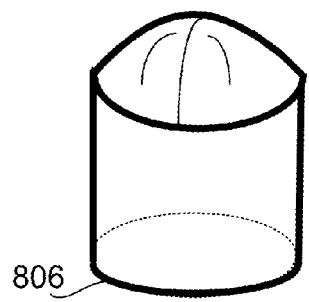
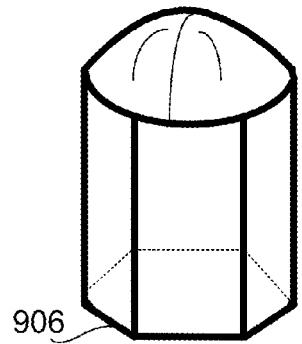
FIG.7          FIG.8          FIG.9
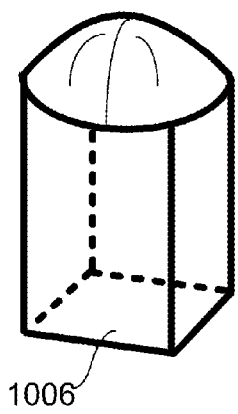
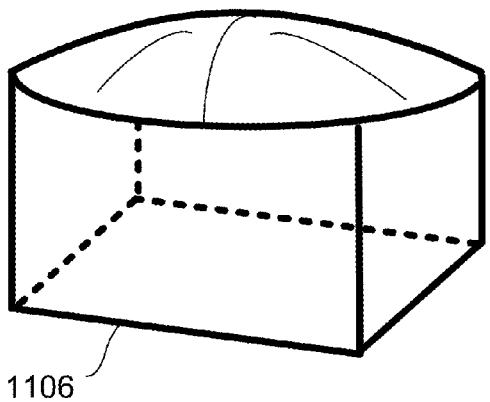
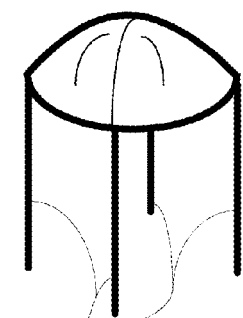
FIG.10         FIG.11         FIG.12

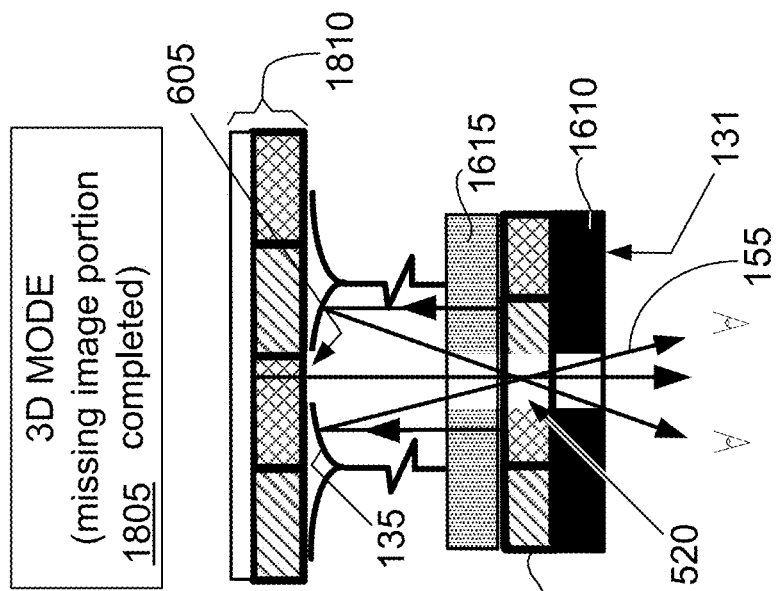
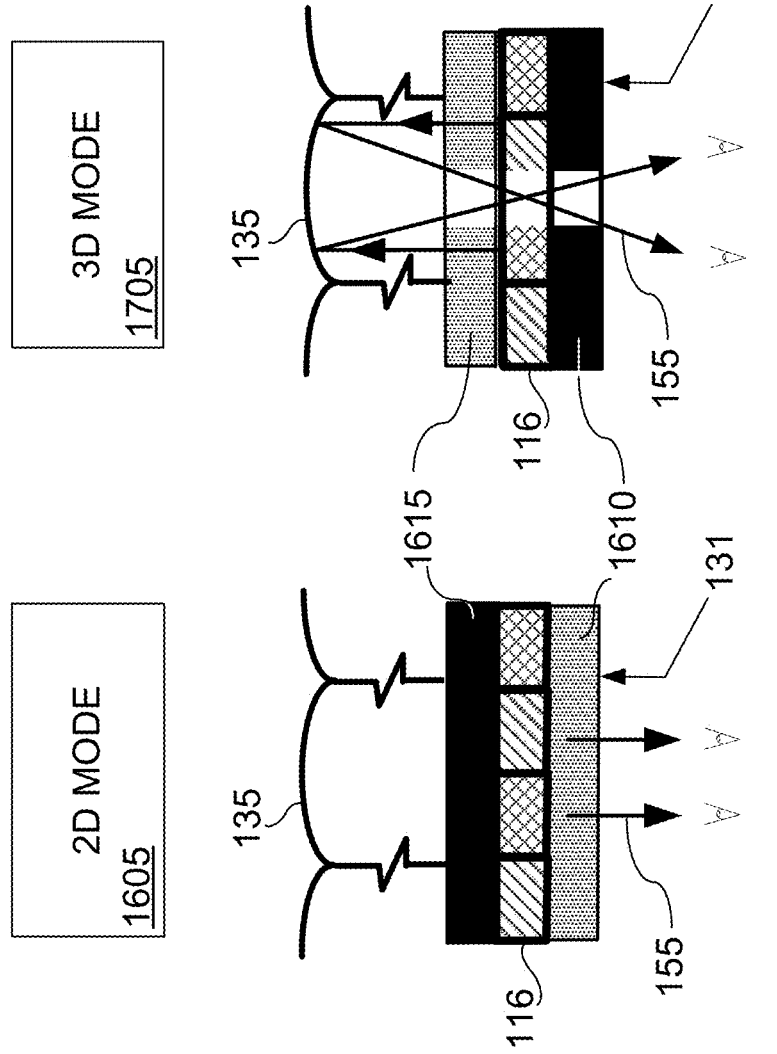

3D MODE INCLUDING REGULAR OLED DISPLAY OR BACKLIT LCD  2010
2015 Regular OLED Display (or backlit LCD) showing missing image portions on black background
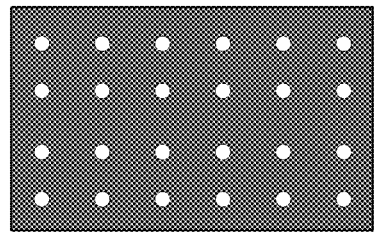
2020 Concave Mirror Section Array with clear spots in mirror troughs
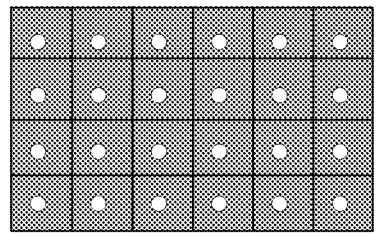
2025 Rear LCD (clear)
2030 Transparent OLED Display with clear spots to let reflected light through
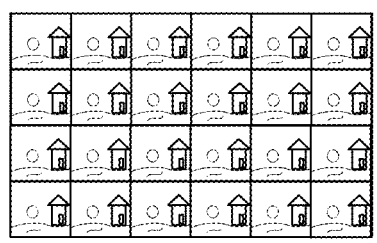
2035 Front LCD (pinhole array parallax barrier)
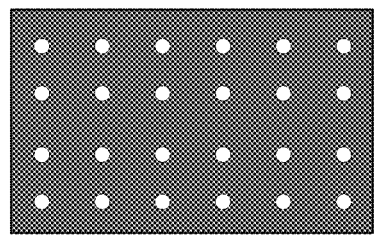
FIG.20

3D MODE - TRANSPARENT OLED DISPLAY USED TO ILLUMINATE A FILM TRANSPARENCY SHEET
2210
2215
Concave Mirror Section Array
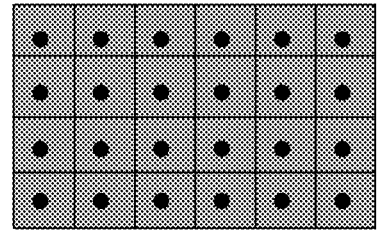
2220
Film Transparency Sheet
2225
Transparent OLED Display
(shows white light with
an array of clear spots)
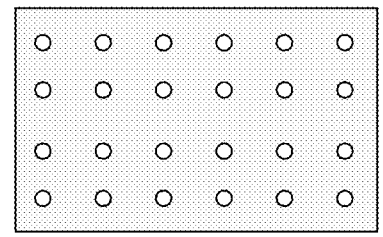
2230
Pinhole array parallax barrier
(LCD, metal, plastic, paint, etc.)
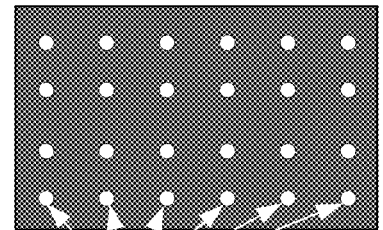
2235
FIG.22

HYBRID 2D/3D MODE — 2310

2315

Concave Mirror Section Array

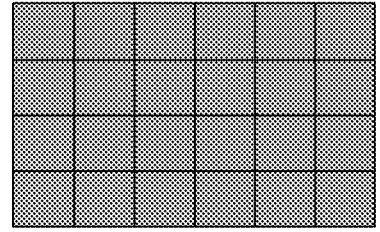

2320

Rear film transparency sheet
(left side array of images with clear spots in their centers, right side clear)

2325  Transparent OLED Display
(left side white light with array of clear spots, right side white light only)

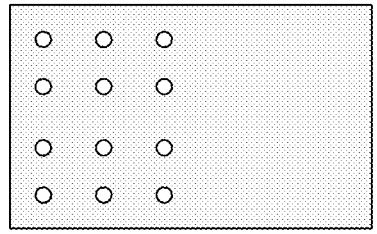

2330

Front film transparency sheet
(left side clear, right side 2D image)

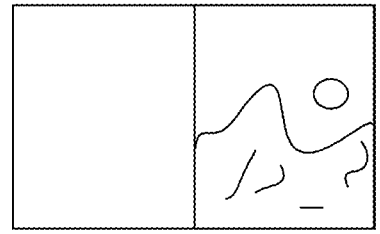

2335

LCD
(left side pinhole array parallax barrier, right side clear)

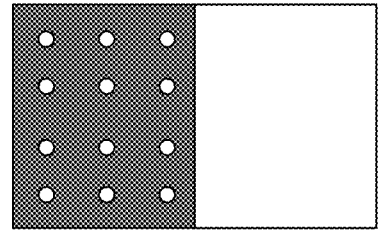

FIG.23

GENERAL PURPOSE AUTO-MULTISCOPIC PIXEL 2D/3D DISPLAY
2410
2415
Concave Mirror Section Array
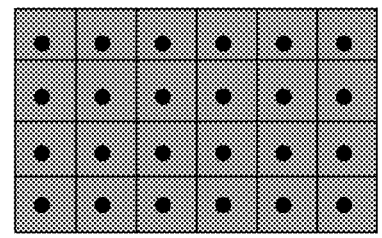
2420 Transparent OLED Display (left half images comprise a 3D picture in aggregate, right half images comprise a 2D picture in aggregate)
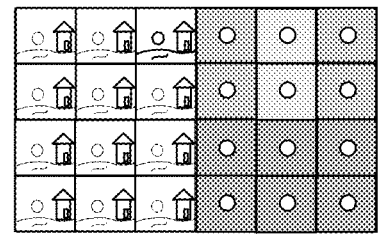
2425
Pinhole array parallax barrier
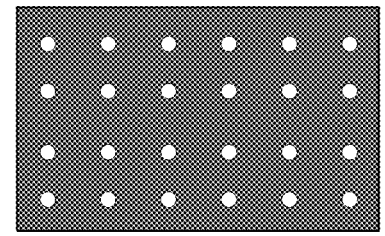
FIG.24

"GENERAL PURPOSE AUTO-MULTISCOPIC PIXEL"
2D/3D DISPLAY
2510
2515
Concave Mirror Section Array
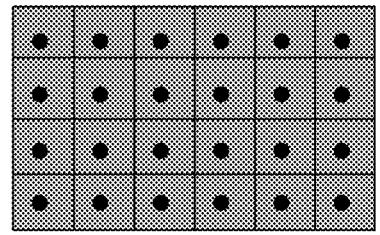
2520   Film transparency sheet
(left half images comprise
a 3D picture in aggregate, right half
images comprise a 2D picture in
aggregate)
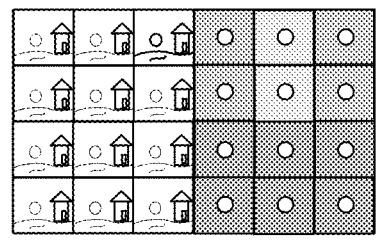
2525
Transparent OLED Display
(displays white light with
an array of clear spots)
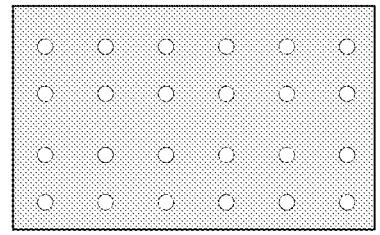
2530
Pinhole array parallax barrier
(LCD, metal, plastic, paint, etc.)
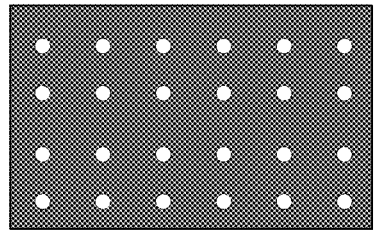
FIG.25

AUTO-MULTISCOPIC 3D DISPLAY SYSTEM

TECHNICAL FIELD

In the field of optical systems and elements, a three-dimensional screen display system includes a transparent OLED display, a transparent spot array parallax barrier and a concave mirror array specially adapted to project light from the display system in a manner that renders different images to viewers in different locations in front of the display system.

BACKGROUND ART

This invention provides improvements over the inventor's earlier application for a 3D billboard display system. That patent application is U.S. application Ser. No. 15/084,221, (the '221 application) filed 29 Mar. 2016, which is hereby incorporated by reference herein. The billboard display system disclosed in the '221 application utilizes a light source housed in a box-like structure. The light source shines light away from a non-transparent front wall and through a transparent rear wall and thence through a sheet of projection film having an array of images thereon and thence is reflected by a corresponding array of concave mirrors back to corresponding apertures. The apertures are formed at the bottom of indentations, preferably cone-shaped throughout the area of the front wall. The light passes through the apertures and thence out of the indentations to create a 3D image in the eyes of a viewer looking at the front wall.

While many of the operating principles are the same, the present invention includes embodiments that utilize one or more transparent organic light emitting diode (OLED) displays and Liquid Crystal Displays (LCDs) to enable full motion 3D displays. The '221 application uses a display lamp apparatus consisting of a non-transparent front wall with an array of pinholes and indentations, one or more light sources and a transparent rear wall with an array of pinholes. This display lamp apparatus is replaced here entirely by the combination of a transparent OLED display and a pinhole array (transparent spot) parallax barrier, and/or LCDs.

The overall display is expected to display dynamic 3D images on flat screen televisions, monitors, tablets, smartphones, and other electronic display devices without any need for 3D enabling glasses. The term auto-multiscopic is used to define a display that allows multiple viewers to view three-dimensional scenes on a display, simultaneously and without the need for 3D glasses.

The present invention provides a screen display system that displays auto-multiscopic 3D images or videos and may also be used to show 2D images or videos. The images or videos are generated by an array of auto-multiscopic pixels in the space near the display system that share a common imaginary display surface such as a plane. This imaginary display surface may also be curved or contoured. The auto-multiscopic pixels are generated by an array of auto-multiscopic pixel generating cells housed in the display system. Each auto-multiscopic pixel emits a cone of light rays from a fixed point in space. This screen display system enables multiple viewers of the display to see different 3D (or two-dimensional) images on the display from different locations in the space in front of the display.

Standard 3D integral photography was first proposed in 1908 by Gabriel Lippman, as a means of capturing 3D image information using 2D film surfaces. Since then, various methods have been used to display auto-multiscopic 3D images using source images on 2D surfaces, but they all suffer from drawbacks.

SUMMARY OF INVENTION

A display system enables auto-multiscopic three-dimensional viewing of both static images and video productions. It includes a parallax barrier defining a front surface of the display system, the parallax barrier being non-transparent except for an array of transparent spots or holes. A transparent Organic Light-Emitting Diode (OLED) display is located behind the parallax barrier. It has color pixels and an array of clear spots adjacent to the array of transparent spots or holes on the parallax barrier. The transparent OLED display sends light away from the viewer towards an array of concave mirrors, one concave mirror for each transparent spot. Each concave mirror reflects the light back through the alignment of the clear spot on the transparent OLED display with transparent spot on the parallax barrier and then out of the front of the display.

Each concave mirror may be part of an enclosure that surrounds the transparent spot over which said concave mirror is centered, so that light sent back through the alignment is restricted to that sent to the concave mirror from a particular area of the transparent OLED display surrounding the transparent spot.

Each concave mirror may include a non-reflecting, light absorbing material of approximately the same size and shape as the transparent spot on which the concave mirror is centered to absorb stray light. Alternatively, each concave mirror defines a through-hole through the center of the concave mirror and a second light-emitting display located behind each concave mirror projects light through the through-hole and out of the alignment of clear spot and transparent spot into the space in front of the display, thereby restoring the missing portion of the image emitted by the transparent OLED display. Alternately, this second light-emitting display beyond the concave mirror may be omitted, and the through-hole may be used to enable stray light to escape into a light-absorbing region of the display system beyond the inner surface of the concave mirror.

A convex lens may be positioned below the through-hole in each concave mirror so that light from the second light-emitting display is approximately focused on the alignment of the clear spot and transparent spot. Another optional lens may be positioned adjacent to each transparent spot on the front surface of the parallax barrier to better spread light exiting the transparent spot throughout the space in front of the display.

In an alternative embodiment, the same parallax barrier is used. A similar transparent OLED display is also located behind the parallax barrier, but this transparent OLED display emits only white light. For this embodiment, a sheet of projection film with an array of printed images is positioned behind the transparent OLED display, wherein each image has a dot that is optically clear and centrally located on the image, said dot being aligned with the transparent spot. A similar concave mirror array is utilized to send reflected light back out of the alignment into the space in front of the display.

In another alternative embodiment, a first LCD forms an outer wall facing a viewer and an inner wall opposite the outer wall. The first LCD has pixels that may be activated to one of first-opaque black and first clear to the viewer looking at the outer wall so that a similar parallax barrier can be activated. A transparent OLED display with pixels comprised of Red/Green/Blue/Clear sub-pixels is adjacent to the inner wall of the first LCD so that light can be sent away from the viewer and also so that the transparent OLED display may form clear spots that align with the clear spots on the first LCD. A second LCD is positioned adjacent to the transparent OLED display so as to sandwich the transparent OLED display between the second LCD and the first LCD. The second LCD also has pixels configured to be activated to either opaque black or clear and here again clear spots are aligned with the clear spots on the first LCD and on the transparent OLED display. A similar concave mirror array is used as in the other embodiments. Each concave mirror is positioned so that light directed towards it from the transparent OLED display, if permitted to pass through the second LCD, is subsequently reflected off the concave mirror to then pass through the alignment on which the concave mirror is centered and enable an emission of the light into the space in front of the display.

As with the other embodiments, each concave mirror may define a through-hole at its center so that a light-emitting display positioned beyond the concave mirror can be used to complete the reflected image, or so that stray light in the display can escape into a light-absorbing region of the display system beyond the inner surface of the concave mirror.

Technical Problem

Existing parallax barrier auto-multiscopic displays cause a significant amount of image-related light to be blocked by a parallax barrier from reaching a viewer's eyes, significantly dimming the overall display brightness. For example, pinhole array parallax barriers located between a backlit LCD screen and a viewer trap a lot of light between the LCD screen and the opaque parallax barrier that contains the pinholes. What is needed is a display that uses concave mirrors to guide much of the light generated by an electronic display through pinholes in the pinhole array parallax barrier.

Some auto-multiscopic displays use arrays of convex lenses to focus light at a corresponding array of focal points in a plane near the display. In such displays, ambient light can be reflected off the convex lenses in unwanted directions, affecting the clarity of the resulting 3D image. What is needed is a display system with a parallax barrier as its front wall that absorbs a lot of ambient light, and concave mirrors that direct light generated by a transparent OLED display located behind the parallax barrier through pinholes in the parallax barrier and into the space in front of the display system. This arrangement helps to maintain image clarity as the viewer changes positions relative to the display system.

Auto-multiscopic displays have also been proposed that use a slab of transparent material to convert planar input light beams into a plurality of directional output light beams that combine to display a 3D image for a viewer. In such a setup, which may also function as a diffractive backlight for a liquid crystal display screen, particular regions of the slab of transparent material emit directional light beams at fixed respective angles relative to the plane of the display. What is needed instead is a display comprised of an array of auto-multiscopic pixel generating cells, each of which emits multiple directional light beams from a single focal point. This is achieved by using an array of concave mirrors to reflect light rays generated behind the front wall of the display through a corresponding array of pinhole apertures in the front wall of the display.

If such a diffractive backlight is located in close proximity to a liquid crystal display, as for example with a white backlight and color LCD screen, it will still be unable to precisely mimic an array of auto-multiscopic pixels in the plane of the LCD screen without the use of time multiplexing. That is, each LCD pixel on a liquid crystal display screen can display only one color configuration at a time. Thus, having the ability to simultaneously direct multiple white light rays from different regions of a diffractive backlight through a single LCD pixel will generally not be a good substitute for an auto-multiscopic pixel at the same location that is capable of emitting differently colored light rays across a variety of angles simultaneously.

Alternately, if the light rays from such a diffractive white backlight pass through a liquid crystal display in close proximity to the backlight, and are then made to converge at focal points in a planar array of focal points parallel to the plane of the LCD screen but closer to the viewer, then the lack of a front wall of the display that has pinholes in it will expose the LCD screen to illumination by ambient light. What is needed is a display that is capable of releasing differently colored light rays at a variety of angles from each auto-multiscopic pixel generating cell through a single focal point for each cell, with no need for time multiplexing to achieve this, and in a way that largely prevents ambient light from interfering with the display.

A 3D display design uses dual LCD screens in its exemplary implementation to create a content adaptive parallax barrier that generates auto-multiscopic 3D images for viewers when illuminated by a backlight. Calculations are made to determine respective images to display on the front and rear LCD screens, generally enabling a brighter auto-multiscopic 3D image to be displayed than would be possible if the front screen were a pinhole array parallax barrier. However, this design does not alter the trajectories of light rays emitted by the rear screen at perpendicular angles to the rear screen before they reach the front screen, meaning that many such light rays can still be attenuated or blocked by the front screen. What is needed is a display system design that uses a concave mirror array to reflect light rays emitted by a transparent OLED display located behind a pinhole array parallax barrier that comprises the front wall of the display system, which initially travel away from the viewer along trajectories perpendicular to the front wall of the display system, through clear spots in the same transparent OLED display and thence through pinhole apertures in the front wall of the display system and into the space in front of the display system.

Some displays are based on the use of a series of projectors (sometimes accompanied by flat side mirrors) that precisely focus their respective images on a common display screen, generating auto-multiscopic pixels on the plane of the display screen. This technique as currently implemented is non-optimal for the following three reasons:

Firstly, the multiple projectors in such a display must be located at a distance from the display screen itself, giving the overall display a large form factor in comparison to a conventional 2D flat screen display. What is needed is a display apparatus that naturally minimizes the distance between projector and display screen, by first projecting light in directions away from a viewer and then reflecting it back through the plane of the display screen using a concave mirror array.

Secondly, the set of 2D pixels that generates each respective auto-multiscopic pixel in the plane of the display screen is determined by the number of projectors in such a display, which must be greater than one to generate any auto-multiscopic effect, and which furthermore also limits the auto-multiscopic pixel resolution of the overall display to the pixel resolution of an individual projector. What is needed instead is a display system that uses only one integrated projection system to generate auto-multiscopic 3D images, and in which the number of 2D pixels that generate a respective auto-multiscopic pixel in the plane of the display screen can be varied by varying the resolution of the transparent OLED display, and furthermore in which the number of pixels in the overall display system can be additively increased by tiling multiple display systems of the same type together to form a larger overall display system.

Thirdly, auto-multiscopic pixels in different regions of a display screen of this type emit differently shaped light cones, because the projectors behind the display screen are not arranged behind each point on the display screen with identical symmetry. What is needed is a display in which auto-multiscopic pixel generating cells are relatively uniform in shape, and thus emit light cones that are similar in shape.

Solution to Problem

The solution is an auto-multiscopic 3D display system that includes a transparent OLED display located directly adjacent to a pinhole array parallax barrier that forms the front wall of the display system. The parallax barrier is ideally colored black, and may either be a standalone component like a sheet of metal, or painted onto one face of the transparent OLED display. A viewer looking at the pinhole array parallax barrier would be unable to directly see most of the transparent OLED display's surface, which lies behind the parallax barrier with respect to the viewer.

One type of transparent OLED display contains an array of pixels that each consists of red, green, blue and clear sub-pixels. However, the regions of the transparent OLED display that are adjacent to the pinholes on the pinhole array parallax barrier may contain an alternate arrangement of pixels, such as all clear sub-pixels if this is feasible, in order to maximize their transparency.

When energized, the pixels in the transparent OLED display that are directly adjacent to the pinholes in the parallax barrier are left either off or very dim, resulting in clear (i.e. transparent) spots in the transparent OLED display, each of which is adjacent to a respective pinhole in the pinhole array parallax barrier. Thus, a viewer looking directly through the pinholes in the parallax barrier would also be able to see directly through the corresponding clear spots on the transparent OLED display.

In operation of the overall display system, an array of images is displayed on the transparent OLED display, each of which has a clear spot at its center that is adjacent to a pinhole in the pinhole array parallax barrier.

A concave mirror array facing the transparent OLED display is positioned so that the mirrors in the array can receive light from the transparent OLED display as it travels away from a viewer of the overall display system along trajectories perpendicular to the surface of the transparent OLED display, and reflect this light back towards the corresponding focal points of concave mirrors in the array. By design, these concave mirror focal points are located in or near the corresponding clear spots on the transparent OLED display. Preferably, there is only air between an individual image on the transparent OLED display and the corresponding concave mirror's inner surface so as to avoid image distortion, but a lens or other significantly transparent material (such as a sheet of projection film) may be optionally used in that volume. Sending the reflected light through the clear spots in the transparent OLED display and thence out of the pinholes in the pinhole array parallax barrier, creates 3D (or 2-dimensional) images in the eyes of one or more viewers looking at the pinhole array parallax barrier.

Each concave mirror may be part of an enclosure that surrounds each image in the array of images shown on the transparent OLED display, so as to prevent stray light from one such enclosure from mixing with the light within any other enclosure. An enclosure's walls, located between the transparent OLED display and the enclosure's concave mirror, may have any cross-sectional shape. As examples, the cross-sectional shape of an enclosure's walls may be circular, oval, hexagonal, rectangular, or square.

Each concave mirror typically has a pinhole-shaped spot at its center from which it is preferable that no incoming light be reflected through the pinhole. So, a concave mirror may include a non-reflecting, light absorbing material of approximately the same size and shape as the corresponding pinhole at this pinhole-shaped spot. Alternatively, a concave mirror may define a hole at the pinhole-shaped spot and a second electronic display (such as a regular OLED display or a backlit LCD) adjacent to this pinhole-shaped spot may be used to project the missing image portion through the clear spot in the transparent OLED display and then out of the pinhole in the pinhole array parallax barrier. A convex lens may additionally be used to facilitate the focusing of this light in or near the clear spot in the transparent OLED display.

In an alternate configuration, the transparent OLED display is made to emit only white light on substantially all areas of its surface except an array of clear spots, each of which clear spots is adjacent to a pinhole in the pinhole array parallax barrier. The transparent OLED display is thus made to function as a flat panel shaped lamp that emits white light on all areas of its surface except said array of clear spots, which remain transparent. A sheet of projection film (ideally color positive film) containing an array of images is then placed directly behind the transparent OLED display from the perspective of a viewer of the display system. There is one image on the sheet of projection film for each pinhole in the pinhole array parallax barrier, and each image on the sheet of projection film has a clear spot or hole at its center corresponding roughly in shape and size to the pinholes in the pinhole array parallax barrier.

When the transparent OLED display emits white light, this light illuminates the images on the adjacent sheet of projection film. Light from these images then travels away from a viewer of the overall display. Light rays moving along perpendicular trajectories to the sheet of projection film are then reflected by the concave mirror array to the focal points of the respective concave mirrors, which lie in or near the clear spots on the transparent OLED display. These reflected light rays travel through the clear spots in the transparent OLED display and thence through the pinholes in the pinhole array parallax barrier and out into the space in front of the overall display, generating auto-multiscopic images.

Advantageous Effects of Invention

The auto-multiscopic 3D display is capable of generating a wide field of view 3D image for a viewer, which exhibits both horizontal and vertical parallax for a broad range of viewer positions in front of the billboard.

In operation of the device, light rays are emitted by the transparent OLED display. A large portion of these light rays initially travel away from the viewer along trajectories perpendicular to the plane of the display, and are subsequently reflected back by concave mirrors through clear (i.e. transparent) spots in the transparent OLED display and thence through adjacent pinholes in the pinhole array parallax barrier that comprises the front wall of the display system. The focal points of these concave mirrors are thus positioned in locations that enable light reflected off the concave mirrors to exit the display system through pinholes in the front wall of the display system, and spread into the space in front of the display system across a wide range of angles. This results in the generation of a 3D integral image that uses light generated in the display efficiently, and also greatly limits the ability of ambient light to interfere with light emitted by the display system.

The short distances between an individual image on the transparent OLED display and its respective concave mirror reduce the need for specialized collimating of the light in the display, as light only travels a short distance from an individual image on the transparent OLED display before reaching the inner reflecting surface of the concave mirror. This helps to limit the angular dispersion of light rays from optimal trajectories perpendicular to the plane of the display before these light rays reach the inner reflecting surface of the concave mirror. In other words, the use of a concave mirror enables a significant portion of light rays emitted by an individual image on the transparent OLED display (which image surrounds a clear spot on the transparent OLED display) to hit the concave mirror at angles from which they can be cleanly reflected through the focal point of the concave mirror and out into the region of space in the front of the display.

Auto-multiscopic pixel density and quality in the display is limited by the dimensions and focusing precision of the concave mirrors in the concave mirror array, the dimensions and transparency of the clear spots in the transparent OLED display, and the pinhole diameter below which diffraction of visible light becomes a significant issue.

BRIEF DESCRIPTION OF DRAWINGS

The drawings illustrate preferred embodiments of the auto-multiscopic 3D display system according to the disclosure. The reference numbers in the drawings are used consistently throughout. Except for partial views, new reference numbers in FIG. 2 are given the 200 series numbers. Similarly, new reference numbers in each succeeding drawing are given a corresponding series number beginning with the figure number.

FIG. 7 is a perspective view of an enclosure with a concave mirror section at the top, the enclosure having a circular cross section.

FIG. 8 is a perspective view of an enclosure with a concave mirror section at the top, the enclosure having an oval cross section.

FIG. 9 is a perspective view of an enclosure with a concave mirror section at the top, the enclosure having a hexagonal cross section.

FIG. 10 is a perspective view of an enclosure with a concave mirror section at the top, the enclosure having a square cross section.

FIG. 11 is a perspective view of an enclosure with a concave mirror section at the top, the enclosure having a rectangular cross section.

FIG. 12 is a perspective view of a concave mirror section supported by 4 legs.

FIG. 16 is a top view of an exemplary version of the display system in a 2D mode.

FIG. 17 is a top view of an exemplary version of the display system in a 3D mode.

FIG. 18 is a top view of an exemplary version of the display system in a 3D mode with missing center portions of images restored.

FIG. 20 is an illustration of components vertically oriented for a display system operable in 3D mode with a regular OLED or backlit LCD included as part of the configuration.

FIG. 22 is an illustration of components vertically oriented for a display system operable with a transparent OLED display used to illuminate a film transparency sheet.

FIG. 23 is an illustration of components vertically oriented for a display system operable with a transparent OLED display used to illuminate two film transparency sheets.

FIG. 24 is an illustration of components vertically oriented for a display system that uses auto-multiscopic pixel generating cells exclusively to create a hybrid 2D/3D display operable with a parallax barrier, a transparent OLED display, and a concave mirror section array.

FIG. 25 is an illustration of components vertically oriented for a display system that uses auto-multiscopic pixel generating cells exclusively to create a hybrid 2D/3D display operable with a parallax barrier, a transparent OLED display, a single film transparency sheet and a concave mirror section array.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
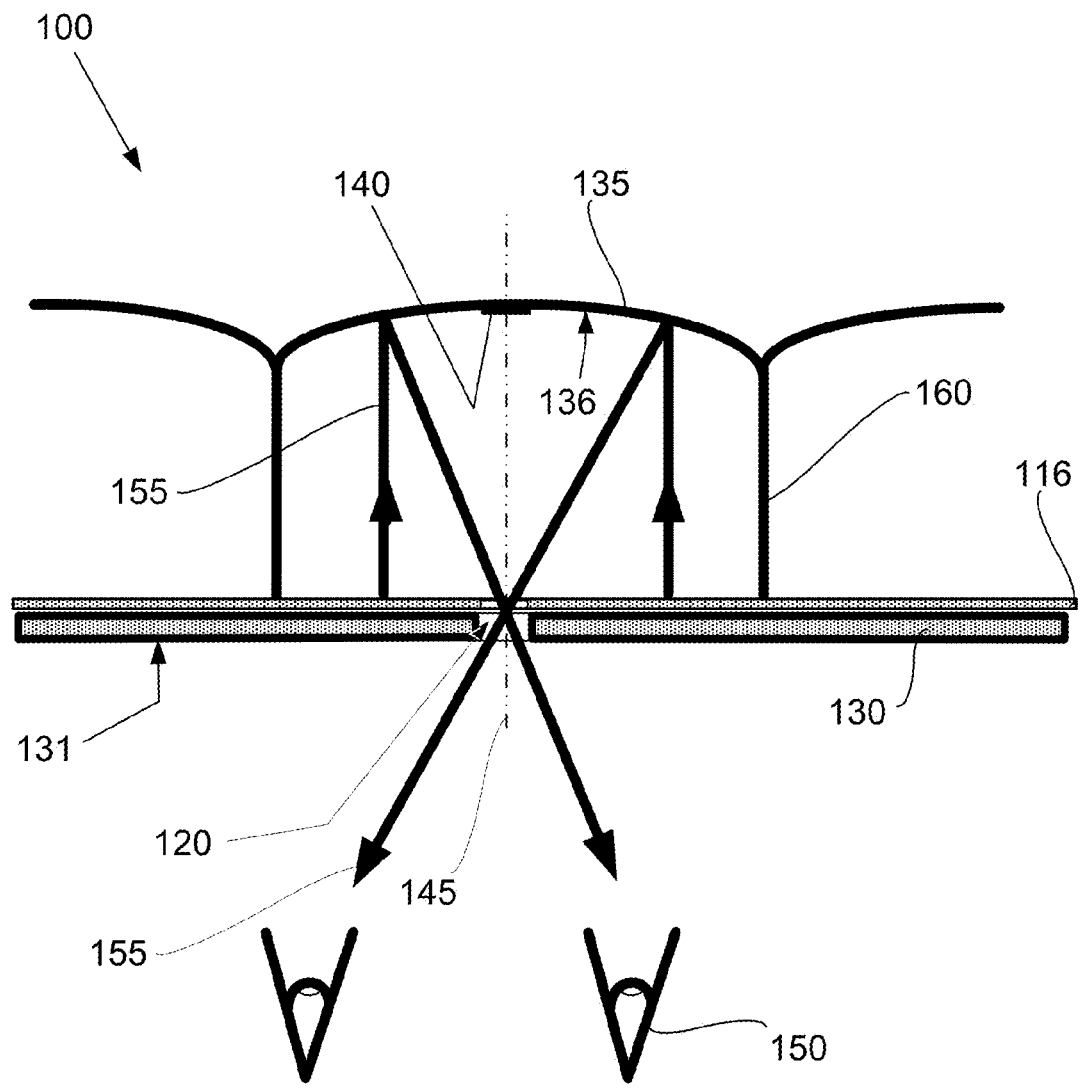
FIG. 1 is a top view of a preferred embodiment of an auto-multiscopic 3D display system.
Figure 2:
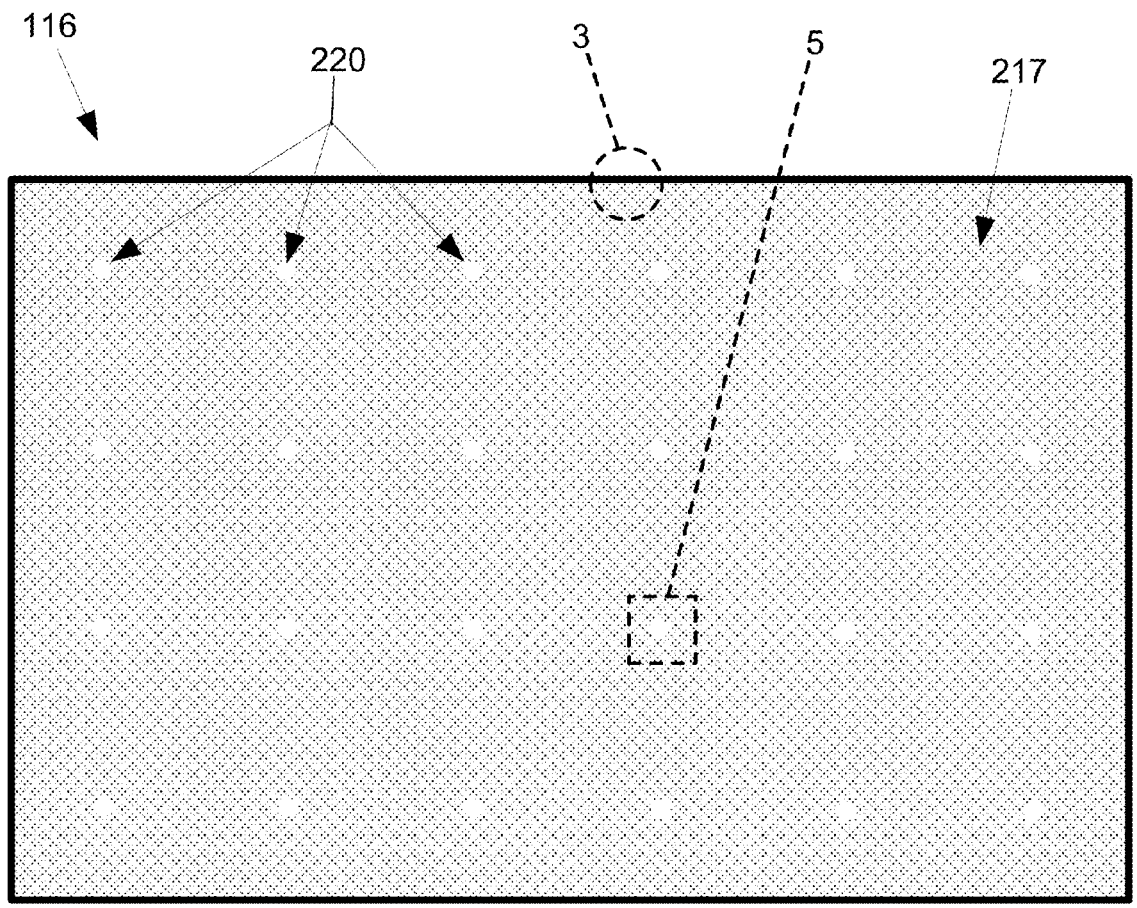
FIG. 2 is an elevation view of a transparent OLED display used in the system.

FIG. 1 illustrates a preferred embodiment of a display system (100), which will enable auto-multiscopic three-dimensional viewing. The display system (100) includes, but is not limited to a parallax barrier (130) having an array of transparent spots (2235), shown in FIG. 22; a transparent OLED display (116), which when the acronym is spelled out is a transparent Organic Light-Emitting Diode (OLED) display; and a concave mirror (135) for each transparent spot (120), shown in FIG. 5, in the array of transparent spots (2235).

The Parallax Barrier

The parallax barrier (130) defines a front surface (131) of the display system (100) that is an outward surface looked at by a viewer (150) of the images or video productions presented on this embodiment of the display system (100). The parallax barrier (130) is preferably a non-transparent surface except for an array of transparent spots (2235) thereon. Any transparent spot (120) in the array of transparent spots (2235) may be a hole that passes through the parallax barrier (130), each hole by its nature being transparent.

In an alternative embodiment, a parallax barrier is fabricated within the volume of the transparent OLED display itself, by placing non-transparent surfaces immediately adjacent (or nearly so) to particular regions within the transparent OLED display, so that they block these regions from the direct view of a viewer during operation of the display system.

The Transparent OLED Display

The transparent OLED display (116) may be curved. As transparent OLED displays can have thicknesses on the order of millimeters, auto-multiscopic 3D displays that use them can have very thin form factors.

The transparent OLED display (116) is located behind the parallax barrier (130), that is, it is preferably the next component further away from the viewer (150) than the parallax barrier (130). The direction "behind" as used herein is from the perspective of the viewer (150) and so means away from the viewer (150).

A transparent OLED display (116) is an electronic display in which pixels generate light directly, with no need for a separate backlight to illuminate them. In one configuration, each pixel on a transparent OLED display (116) consists of Red, Green, Blue and Clear sub-pixels. This configuration makes the display largely transparent in regions where pixels are off or dim and largely opaque regions where pixels are brightly lit.

Figure 3:
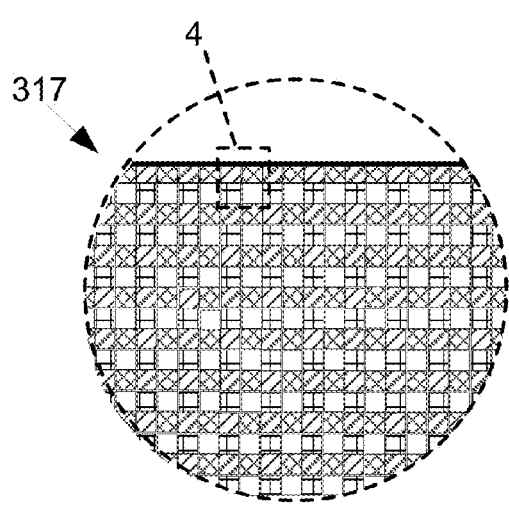
FIG. 3 is a partial view of the transparent OLED display designated by reference number 3 in FIG. 2 and showing pixels.

The transparent OLED display (116) includes an array of pixels (217). Included in the array of pixels (217) is a plurality of pixels (317) wherein each pixel (418) in the plurality of pixels (317), illustrated in FIG. 3, is formed with a plurality of sub-pixels. This inherently means that one or more of the pixels in the array of pixels (217) may comprise a single color or may be clear.

Figure 4:
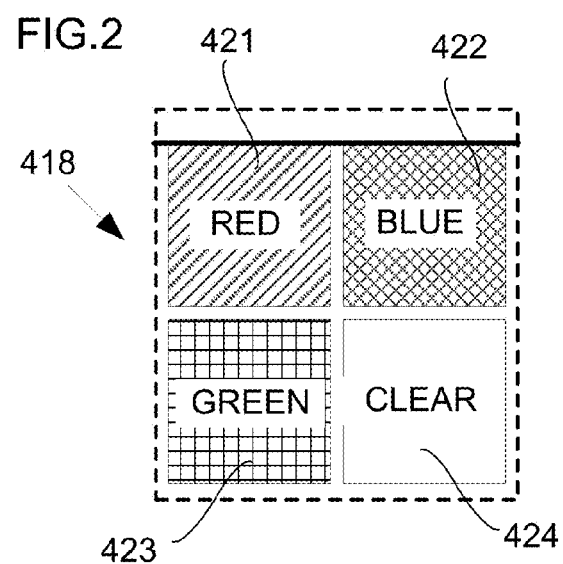
FIG. 4 is a partial view of the transparent OLED display pixel designated by reference number 4 in FIG. 3 and showing sub-pixels.

FIG. 4 illustrates sub-pixels. Each sub-pixel in the plurality of sub-pixels is preferably capable of emitting colored light when on and being transparent when off. However, if no sub-pixel in the plurality of sub-pixels has these characteristics, then each sub-pixel in the plurality of sub-pixels is preferably configured to be activated to one of clear and/or one of the colors red, blue, and green. Thus, each pixel preferably includes a variety of two or more of a red sub-pixel (421), a blue sub-pixel (422), a green sub-pixel (423) and, when off is not transparent for any of these sub-pixels (or none of these sub-pixels can otherwise be activated to clear), a clear sub-pixel (424). The red sub-pixel (421) is configured for the emission of red light. The blue sub-pixel (422) is configured for the emission of blue light. The green sub-pixel (423) is configured for the emission of green light. The clear sub-pixel (424) is configured for transparency. More preferably, there is one of each of these four sub-pixels in each pixel in the plurality of sub-pixels. Also, there may be fewer than four sub-pixels per pixel and there may be more than four sub-pixels per pixel in the plurality of sub-pixels. Furthermore, sub-pixels configured for the emission of light with colors other than red, green or blue may also be included in the plurality of sub-pixels.

Of the plurality of sub-pixels, there is at least one sub-pixel that is configured, or is configurable, for transparency that is positioned behind each transparent spot (120) in the array of transparent spots (2235) on the parallax barrier (130). Preferably, there are as many such sub-pixels configured, or configurable, for transparency as are needed so that a clear spot (520), shown in FIG. 5, on the transparent OLED display (116) can be activated that is about the same size as the transparent spot (120) on the parallax barrier (130) directly in front of that clear spot. The transparent OLED display (116) can thus be configured to form an array of clear spots aligning with the array of transparent spots (2235) on the parallax barrier (130).

Figure 5:
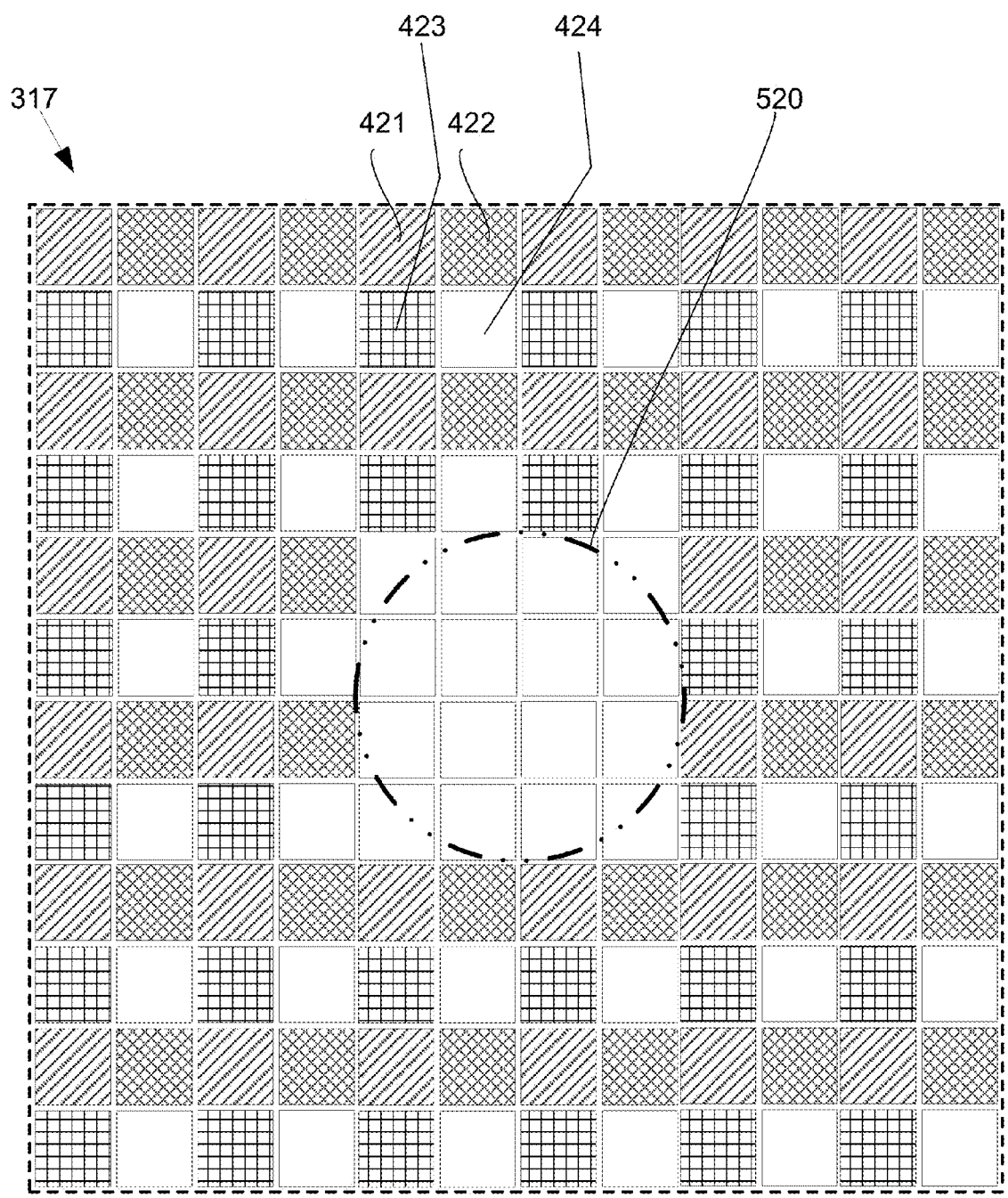
FIG. 5 is a partial view of the transparent OLED display designated by reference number 5 in FIG. 2 and showing sub-pixels configured for transparency and creating a clear spot among other sub-pixels.

FIG. 5 is a hypothetical example of how the pixel matrix of a transparent OLED display might be modified so that the clear spots adjacent to pinholes or transparent spots in the parallax barrier are highly transparent. Since the transparent OLED display is able to function with so many clear sub-pixels, it is likely also possible for a customized display to be created where regions of the display adjacent to pinholes in a pinhole array parallax barrier have pixels that consist of Clear/Clear/Clear/Clear sub-pixels (i.e. making them highly transparent), while other regions of the display have the standard pixels that consist of Red/Green/Blue/Clear sub-pixels (making them behave like typical pixels that consist of Red/Green/Blue sub-pixels against the backdrop of a black colored pinhole array parallax barrier).

A typical pixel display in a type of transparent OLED display would have a regular repeating order of Red/Green/Blue/Clear sub-pixels. Such a display would be useful in a display system capable of showing both 2D and auto-multiscopic 3D images.

The transparent OLED display in FIG. 5 consists of pixels with Red/Green/Blue/Clear sub-pixels in image generating portions and with Clear/Clear/Clear/Clear sub-pixels in the "clear spot" consisting of the 4 clear pixels in the middle (which would be located adjacent to a pinhole or transparent spot in the parallax barrier (130), also referred to herein as the pinhole array parallax barrier.

Alternatives to the Transparent OLED Display

It is also noted here that electronic displays other than a transparent OLED display may be used as an auto-multiscopic image source, so long as the displays are able to maintain an array of clear spots in or near the centers of each image in an array of images that they generate.

For example, an LED billboard may be configured so that it has an array of transparent spots or holes passing through it, which enable a viewer to see directly through the billboard. A viewer looking at the rear wall of such an LED billboard would thus see the surface of a pinhole array parallax barrier, and would be unable to directly see most of the LEDs on the front of the billboard. If a concave mirror array is then placed in close proximity to the front wall of the billboard display, where there is one concave mirror in the array for each transparent spot or hole in the LED billboard, and this concave mirror enables focusing of light from an individual image on the billboard (which surrounds a transparent spot or hole on the billboard) in the corresponding transparent spot or hole that passes through the billboard (and the individual image), then the billboard will generate an auto-multiscopic display in the space behind its rear wall. If necessary, a cone shaped indentation may also be placed in the rear wall of the LED billboard for each pinhole in the billboard, to enable light emitted by the billboard's LEDs to efficiently spread into the space behind the rear wall after it is reflected off the concave mirrors in the concave mirror array.

In an alternative arrangement, if a backlit LCD or a regular OLED display (i.e., a non-transparent light-emitting display) could somehow be configured so that it contains an array of transparent spots or holes, which enable a viewer to see directly through it, then a concave mirror array can be used in the same manner as described above to enable the display to generate auto-multiscopic images.

Concave Mirror

There is a concave mirror (135) for each transparent spot (120) in the array of transparent spots (2235) on the parallax barrier (130). Each such concave mirror (135) is located behind the transparent OLED display (116) and is centered on one transparent spot in the array of transparent spots (2235) on the parallax barrier (130). Each concave mirror (135) has a reflecting surface (136) positioned so that light (155) from the transparent OLED display (116), if permitted to travel towards the concave mirror, is reflected off the concave mirror (135) to then pass through the at least one sub-pixel configured for transparency in the transparent OLED display (116) and then to pass through the transparent spot on the parallax barrier (130) on which the concave mirror (135) is centered so as to form an emission of light (155) emanating from the one transparent spot on the parallax barrier (130).

Each concave mirror (135) may simply be fixed in space at a distance from the transparent OLED display (116), for example by four legs (1206) extending between the concave mirror (135) and the transparent OLED display (116).

Preferably, each concave mirror (135) is part of an enclosure (160) that surrounds the one transparent spot on the parallax barrier (130) over which said concave mirror (135) is centered. Necessarily, this means that the enclosure (160) also surrounds and is centered on the one or more sub-pixels configured, or configurable, for transparency on the transparent OLED display that are behind each transparent spot (120) on the parallax barrier (130). The concave mirror (135) preferably sits at the top or end of the enclosure (160) that is most distant from the transparent OLED display. The enclosure (160) preferably has non-transparent walls located between the transparent OLED display (116) and the concave mirror (135), and running perpendicularly to the plane of the transparent OLED display, so as to minimize stray light entering the enclosure from sub-pixels in the array of pixels (217) that would otherwise be located outside the enclosure (160).

In various embodiments, the concave mirror (135) for each transparent spot (120) in the array of transparent spots (2235) may comprise a concave mirror section that forms part of a large array of adjacent concave mirror sections. This may be efficiently accomplished, for example, by using an array of hexagonally packed concave mirror sections that resemble a so called "fly eye" or "fly's eye" lens sheet. An array of hexagonally packed concave mirror sections is comprised of individual concave mirror sections (that each resembles a hexagon when viewed through its central axis) tiling a plane, thus generating an overall honeycomb like pattern.

In such exemplary embodiments, packing of concave mirror sections in a plane would help to maximize the efficient use of light (155) in the display system (100). It is also simpler to fabricate a single "fly's eye" concave mirror array "sheet," in which all concave mirror sections are designed to easily align with the pinholes in the display, than to fabricate a large number of individual concave mirrors and then try to align each one manually. For example, a concave mirror array sheet might be formed using a mold.

The enclosure (160) preferably has the same cross-sectional shape as the image over which it sits. However, the enclosure (160) may have any cross-sectional shape. For purposes of this explanation, the cross-section of an enclosure is in a plane parallel to the inner wall (1324) of the parallax barrier (130), located between the transparent OLED display (116) and the nearest point or points of the concave mirror section to the transparent OLED display. In preferred embodiments, the cross-sectional shape may be selected from the group consisting of circular (706), oval (806), hexagonal (906), rectangular (1106) and square (1006).

Alternatively, barrier walls between enclosures may be omitted (or removed), in which case concave mirror sections would share only edges with each other rather than both edges and barrier walls. This arrangement is useful if the transparent OLED display emits reasonably collimated light, thus reducing unwanted mixing of light between adjacent auto-multiscopic pixel generating cells. In yet other alternative exemplary embodiments, other packings of concave mirror sections in a plane are possible. Square or rectangular packings, in particular, are ideal because they complement the rectangular packings of 2D pixels on most modern electronic 2D displays.

As an example of this, a transparent OLED display may be comprised of highly transparent glass on its outer surfaces. The front surface of the transparent OLED display with respect to a viewer would be made flat, and could have a pinhole array parallax barrier painted onto it, permanently deposited onto it by some other method, or integrated into the volume of the transparent OLED display. However, on the rear surface of the transparent OLED display with respect to a viewer, the glass that forms the outer surface of the transparent OLED display would be fabricated so that this rear surface forms a rectangular array of raised glass bumps, roughly similar in appearance to the surface of a micro-lens array. Each of these bumps would correspond closely in shape to the inside of a square or rectangular section of a parabolic mirror bowl (also referred to herein as a concave mirror bowl) that covers a precise grouping of pixels on the transparent OLED display. A highly reflective metal like aluminum or silver would then be vacuum deposited on top of this rear glass surface, resulting in a so-called back silvered or second surface concave mirror array from the perspective of a viewer of the display.

The concave mirror (135) preferably includes a non-reflecting, light absorbing material (140) of approximately the same size and shape as the clear spot (520) on the transparent OLED display (116). The non-reflecting, light absorbing material (140) is aligned with the clear spot (520) along an imaginary axis perpendicular to the plane of the transparent OLED display (116) that runs through the center of the clear spot (520). Ideally, when the transparent OLED display is flat and not curved, a significant amount of light (155) from the transparent OLED display (116) approaches the concave mirror (135) along trajectories that are perpendicular to the plane of the front surface (131) of the transparent OLED display (116). Since no light from the transparent OLED display (116) should ideally be emitted towards the concave mirror (135) from within the clear spot (520) itself, any light that would normally reflect off the region of the concave mirror on which this non-reflecting, light absorbing material would be placed and subsequently exit the display system can safely be considered to be stray light that should be absorbed within the display system rather than transmitted into the space in front of the display system.

This non-reflecting, light absorbing material (140) is preferably black paint. When present, the non-reflecting, light absorbing material (140) is preferably centered on a point on the concave mirror (135) marked by an imaginary line (145) extending perpendicularly from an imaginary plane formed by the transparent OLED display, the imaginary line (145) passing through the transparent spot (120). When present, the light absorbing material (140) is visible to the viewer (150) as a black spot when looking directly at the transparent spot (120) head-on.

Alternatively, the concave mirror (135) optionally defines a through-hole (605) through the concave mirror (135), the through-hole (605) being approximately the same size and shape as the transparent spot (120). As with the non-reflecting, light absorbing material (140), the through-hole (605) is positioned directly behind the clear spot in the transparent OLED display (116). The through-hole (605) is located at a point on the concave mirror (135) that is marked by an imaginary line (145) extending perpendicularly from an imaginary plane formed by the transparent OLED display (116), the imaginary line (145) passing through the clear spot in the transparent OLED display. When the through-hole (605) is present, the display system (100) further ideally includes a second light emitting display (such as a backlit LCD or a non-transparent OLED display) that projects light through the through-hole (605) and then through the transparent spot (120). This arrangement thus fills in the image component that would otherwise be missing from the light (155) reflected off the concave mirror (135).

It is also noted that for a sufficiently dense matrix of auto-multiscopic pixel generating cells, there is likely to be a significant amount of overlap between the respective images in adjacent auto-multiscopic pixel generating cells, helping the viewer to compensate for any missing image portions and thus reducing the need to employ an additional light emitting display to fill in the missing image portions. Furthermore, if the missing image portions each comprise only a small fraction of each individual image on the transparent OLED display (116) that is used to generate an individual auto-multiscopic pixel, then it may be entirely reasonable to avoid the use of an additional light emitting display to fill in the missing image portions altogether. This is because an individual viewer will typically be unable to look head-on at all of the auto-multiscopic pixel generating cells in the display simultaneously, and will thus be unable to notice many of the missing image portions (which themselves comprise only a small fraction of the visual information displayed by the display system) from any single vantage point in front of the display system.

In some embodiments, each concave mirror (135) has a non-reflecting, light absorbing material (140) of approximately the same size and shape as the one transparent spot on the parallax barrier (130) on which the concave mirror (135) is centered. The non-reflecting, light absorbing material (140) is centered on the reflecting surface (136) of the concave mirror (135) at a point (1342) on the concave mirror (135) marked by an imaginary line (145) extending perpendicularly from an imaginary plane that is tangent to the center of the one transparent spot on the parallax barrier (130), the imaginary line (145) passing through the center of the one transparent spot on the parallax barrier (130).

In other embodiments, each concave mirror (135) defines a through-hole (605) through the concave mirror (135). This through-hole (605) is approximately the same size and shape as the one transparent spot on the parallax barrier (130) on which the concave mirror (135) is centered. The through-hole (605) is centered at a point (1342) on the concave mirror (135) marked by an imaginary line (145) extending perpendicularly from an imaginary plane tangent to the center of the one transparent spot on the parallax barrier (130), the imaginary line (145) passing through the center of the one transparent spot on the parallax barrier (130).

For embodiments with the through-hole (605), the display system (100) preferably includes a light-emitting display (616) behind each concave mirror (135). Preferably, this light-emitting display (616) is selected from the group consisting of a second transparent OLED display, a non-transparent OLED display and a backlit LCD. In any case, the light-emitting display (616) is positioned to project light (155) through the through-hole (605), so that said light (155) may then pass through at least one sub-pixel configured for transparency in the transparent OLED display, and may then pass through the transparent spot (120) on the parallax barrier (130) behind which said at least one sub-pixel is positioned.

For embodiments with a through-hole (605), the display system (100) may also include a convex lens (1410) positioned below the through-hole (605) in each concave mirror (135) so that light (155) from the light-emitting display (616) is approximately focused on the one transparent spot (120) on the parallax barrier (130). The term "approximately" is used to capture the function of each such lens in roughly focusing the light (155) on the same spot that the image from the respective concave mirror is focused on. Such a convex lens (1410) is largely unnecessary if the through-hole (605) corresponds to only a single pixel on the transparent OLED display (116), but becomes more appropriate to preserve image quality as the through-hole (605) corresponds to increasingly larger clusters of pixels on the transparent OLED display (116). Lenses may also be employed at other locations within or near the display to either focus or disperse light (155). For example, in some embodiments, a second lens (1415) is utilized for each transparent spot (120) in the array of transparent spots (2235) on the parallax barrier (130). Each such second lens (1415) is positioned adjacent to the front surface (131) of the parallax barrier (130).

For embodiments with a through-hole (605), a second light-emitting display beyond the concave mirror (135) may be omitted, and the through-hole may be used to enable stray light to escape into a light-absorbing region of the display system beyond the inner surface of the concave mirror.

Static 3D Only Display

Figure 6:
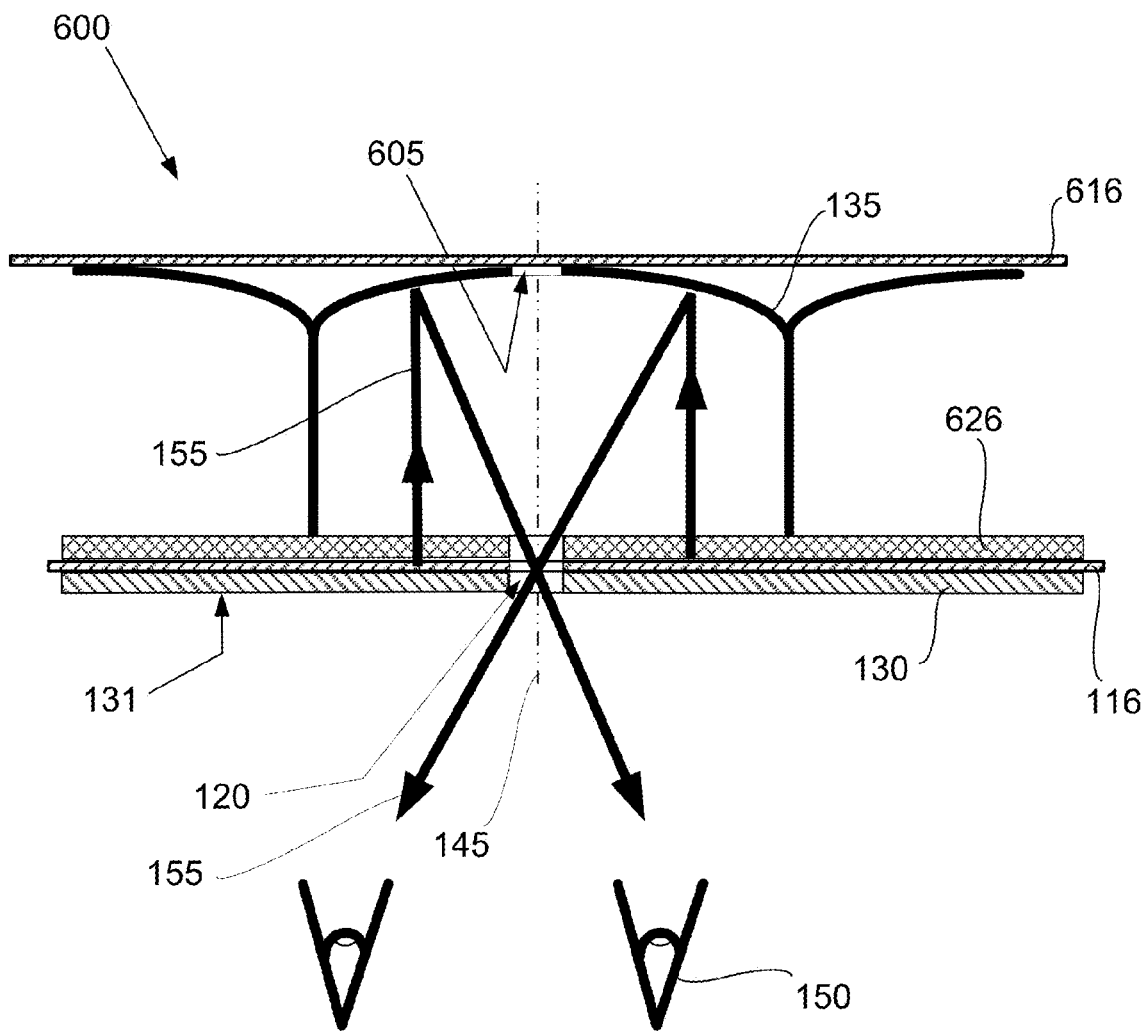
FIG. 6 is a top view of a second preferred embodiment of an auto-multiscopic 3D display system.

In an alternative embodiment, shown in FIG. 6, a second display system (600) enables auto-multiscopic three-dimensional viewing. This second display system (600) is similar to the preferred embodiment of the display system (100), described above. This embodiment adds a sheet of projection film (626) behind a transparent OLED display that emits white light. Thus, the second display system (600) includes a parallax barrier (130); a transparent OLED display (116); a sheet of projection film (626); and a concave mirror array.

The parallax barrier (130) is the same as that described above for the preferred embodiment of the display system (100). Similarly, the parallax barrier (130) defines the front surface (131) of the second display system (600). The parallax barrier (130) is non-transparent except for an array of transparent spots (2235) thereon.

The transparent OLED display (116) is located behind the parallax barrier (130). This transparent OLED display (116) includes an array of pixels (217) that emit light (155) that is white in color in a direction away from the parallax barrier (130), except that no light (155) is emitted from the transparent OLED display (116) at positions behind each of the transparent spots in the array of transparent spots (2235) on the parallax barrier (130).

The sheet of projection film (626) has printed on it a grid-like array of images (1505). The sheet of projection film (626) is positioned behind the transparent OLED display (116), wherein each image in the grid-like array of images (1505) has a dot (1510) that is optically clear and centrally located on the image. Each dot (1510) is centered on one transparent spot in the array of transparent spots (2235) on the parallax barrier (130). Each dot (1510) is approximately the same size and shape as the one transparent spot in the array of transparent spots (2235) on the parallax barrier (130) on which it is centered.

In this embodiment, there is a concave mirror (135) for each transparent spot in the array of transparent spots (2235) on the parallax barrier (130), similar to the arrangement in the embodiment of the display system (100), described above. Each concave mirror (135) is located behind the sheet of projection film (626) and centered on one dot (1510) on the sheet of projection film (626). Each concave mirror (135) is positioned so that light (155) from the transparent OLED display (116) passes through each image in the grid-like array of images (1505) on the sheet of projection film (626) and is then reflected off the concave mirror (135) and then passes through the dot (1510) on the sheet of projection film (626) on which the concave mirror (135) is centered and then through the one transparent spot on the parallax barrier (130) so as to form an emission of light (155) emanating from the one transparent spot on the parallax barrier (130).

Example

Static 3D Only Display

The transparent OLED display (116) is used as a white light source (i.e. display lamp) in a static auto-multiscopic 3D display system, replacing the "display lamp" and the "rear wall of the display" in the '221 patent application referenced in the Background Art section of this application.

In this example, the transparent OLED display illuminates an array of images on a sheet of projection film that each has a clear spot in its center. The transparent OLED display emits white light from most areas of its surface with the exception of the pinhole shaped areas adjacent to the pinholes in the pinhole array parallax barrier, which remain clear. By periodically varying the intensity of white light in various regions of the transparent OLED display, simple auto-multiscopic effects may be created.

FIG. 6 illustrates this exemplary static display system. The transparent OLED display (116) has a clear spot (520) adjacent to the transparent spot (120) on the parallax barrier (130). Light (155) reflected off the parabolic mirror (equivalently referred to as "concave mirror" (135)) passes through this clear spot (520) and then through the transparent spot (120) on its way toward the viewer (150). Note that the clear spot (520) on the transparent OLED display (116) may be made to have a wider diameter than the transparent spot (120) if needed to limit the amount of stray light emitted near the edges of the clear spot (520) on the transparent OLED display (116) that can directly escape the display system through the transparent spot (120) on the parallax barrier (130) without being reflected off the concave mirror (135).

Second Alternative Embodiment

Figure 13:
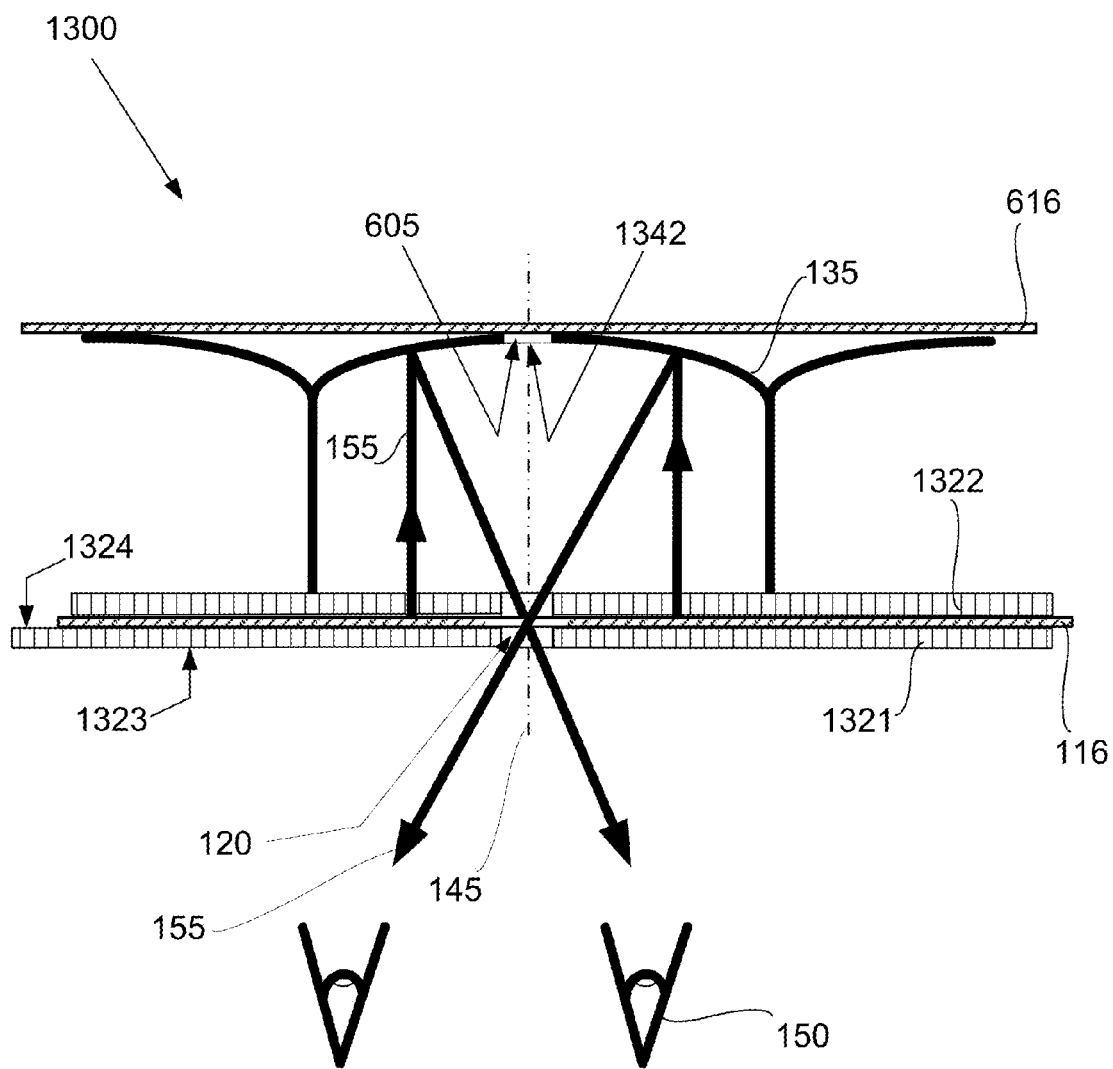
FIG. 13 is a top view of a third preferred embodiment of an auto-multiscopic 3D display system.
Figure 14:
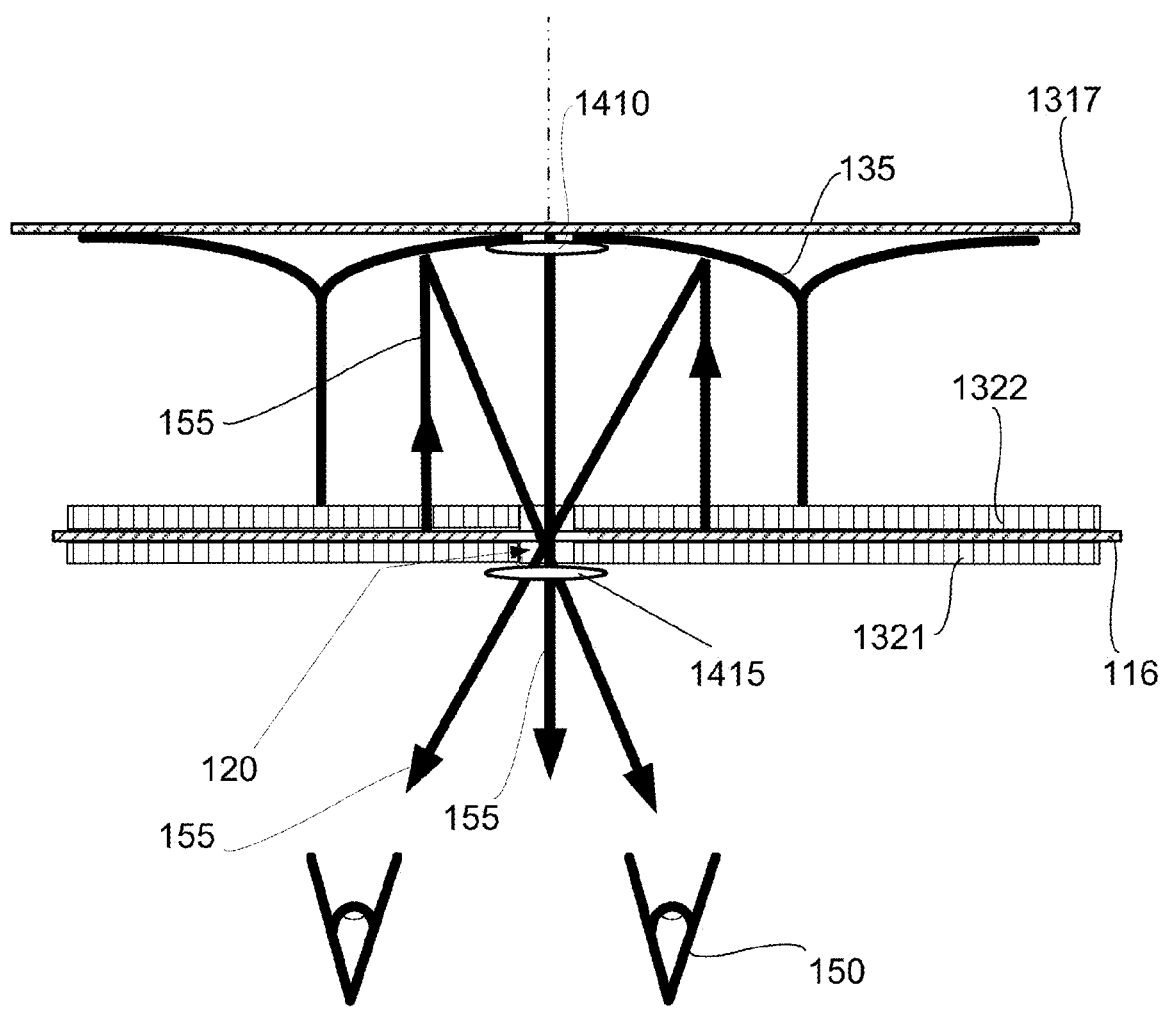
FIG. 14 is a top view of a third preferred embodiment of an auto-multiscopic 3D display system showing the addition of lenses below (with regard to the drawing orientation) the concave mirror and below a first LCD.
Figure 15:
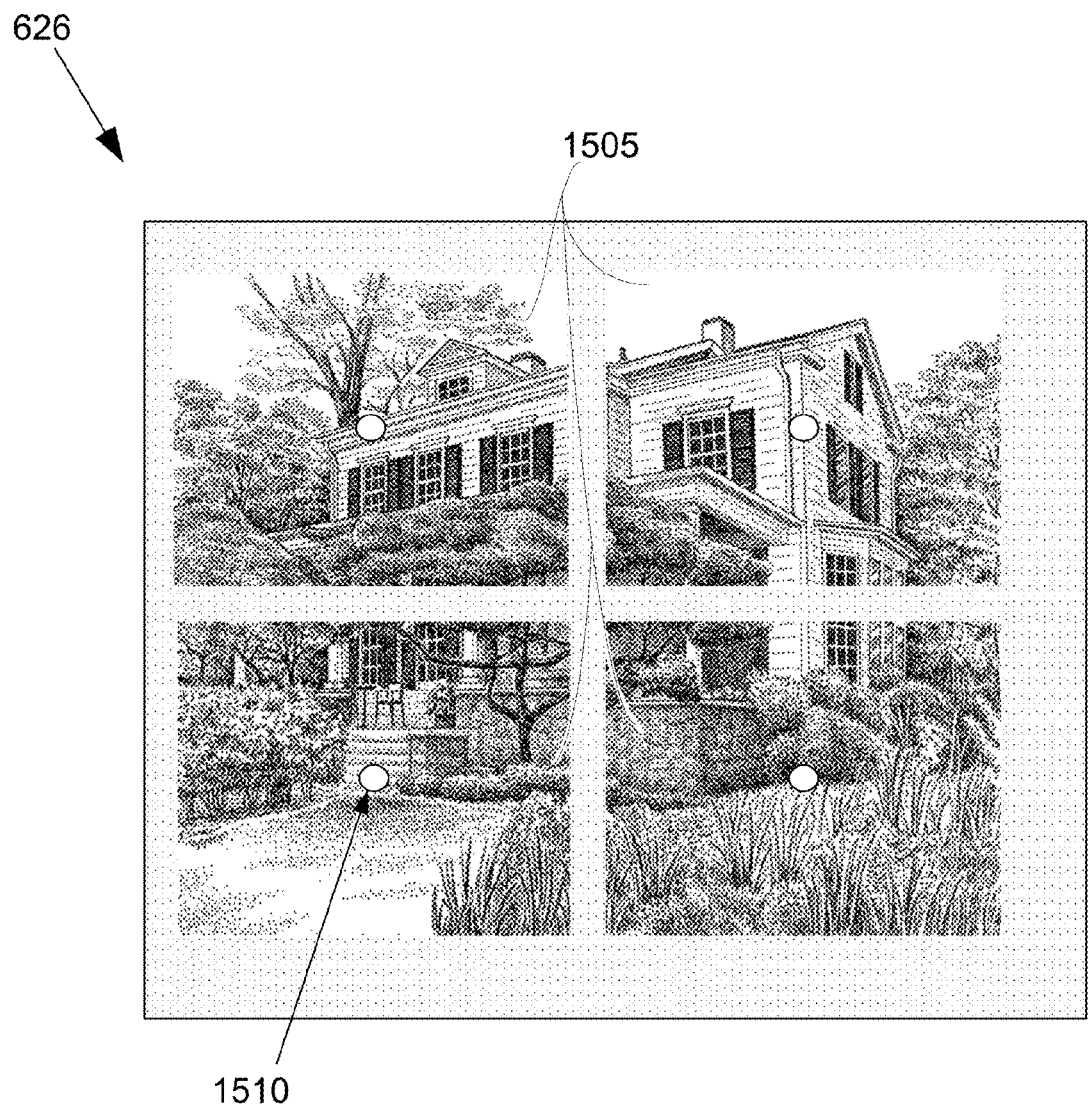
FIG. 15 is an elevation view of a sheet of projection film showing a grid-like array of 4 images with dots that are optically clear at their centers.

In a second alternative embodiment, shown in FIG. 13, a third display system (1300) enables two-dimensional and three-dimensional viewing. This third display system (1300) is similar to the preferred embodiment of the display system (100), described above, except that it uses two Liquid Crystal Displays (LCDs) to facilitate the display of 2D and 3D images, one of which LCDs may be made to function as a pinhole array parallax barrier. A transparent OLED display (116) is similarly used as a light source for the images.

The third display system (1300) includes a first LCD (1321), a transparent OLED display (116); a second LCD (1322) adjacent to the transparent OLED display (116); and an array of concave mirrors.

The first LCD (1321) forms an outer wall (1323) facing a viewer (150) and an inner wall (1324) opposite the outer wall (1323). The first LCD (1321) includes first LCD pixels that may be activated to one of first-opaque black and first clear to the viewer (150) looking at the outer wall (1323).

The transparent OLED display (116) is positioned adjacent to the inner wall (1324) of the first LCD (1321), in other words, behind the first LCD (1321). The transparent OLED display (116) includes an array of pixels (217). The array of pixels (217) includes a plurality of pixels (317) that are formed with a plurality of sub-pixels, which may include, but is not limited to, two or more of a red sub-pixel (421), a blue sub-pixel (422), a green sub-pixel (423) and a clear sub-pixel (424).

Each sub-pixel in the plurality of sub-pixels comprises one of a red sub-pixel (421) that emits red light, a blue sub-pixel (422) that emits blue light, a green sub-pixel (423) that emits green light and a clear sub-pixel (424) that is configured for transparency. Sub-pixels that emit other colors of light may be used, and sub-pixels that emit light may also be configured to be of a type that are largely transparent when off, or may otherwise be activated to be clear.

At least one sub-pixel in the plurality of sub-pixels which is configured for transparency (or may otherwise be activated to be clear) is positioned behind one or more of the first LCD pixels in the first LCD (1321) that may be activated to first clear. It is also noted that any sub-pixel may be configured for transparency either because it is a sub-pixel that is always clear, or because it is a sub-pixel capable of emitting colored light that becomes transparent when turned off (or when otherwise be activated to be clear).

The second LCD (1322) is positioned adjacent to the transparent OLED display (116) so as to sandwich the transparent OLED display (116) between the second LCD (1322) and the first LCD (1321).

The second LCD (1322) includes second LCD pixels that are configured to be activated to one of second-opaque black and second-clear.

For some embodiments, one or more of the second LCD pixels that is configured to be activated to second-clear is adjacent to at least one sub-pixel in the plurality of sub-pixels that is configured for transparency in the transparent OLED display (116). Preferably, there is a plurality of such second LCD pixels adjacent to said at least one sub-pixel in the plurality of sub-pixels that is configured for transparency in the transparent OLED display (116).

There is a concave mirror (135) for each alignment of the clear spots in the two LCDs and the transparent OLED display: Specifically, this refers to each alignment of second LCD pixels configured to be activated to second-clear, the at least one sub-pixel in the plurality of sub-pixels that is configured for transparency (or may otherwise be activated to be clear) in the transparent OLED display (116), and the first LCD pixels in the first LCD (1321) that may be activated to first clear.

Each concave mirror (135) is located behind the second LCD (1322) and is centered on each said alignment. Each concave mirror (135) is positioned so that light (155) may be directed towards the reflecting surface (136) (its inner surface) from the transparent OLED display (116). The light (155) passes through the second LCD (1322) and is then reflected off the concave mirror (135) to then pass through the alignment on which the concave mirror (135) is centered. This passage of light through the alignment enables an emission of the light (155) into the space in front of the display, which light will appear to emerge from the first LCD pixels that may be activated to first clear in the first LCD (1321).

As with all the other embodiments, each concave mirror (135) in the third display system (1300) may define a through-hole (605) at its center. Also, similarly, for this embodiment there is preferably a light-emitting display (616) positioned beyond the concave mirror (135). The light (155)-emitting display is positioned to project light (155) through the through-hole (605), then through one or more second LCD pixels activated to second-clear, then through the at least one sub-pixel configured for transparency in the transparent OLED display (116), and then through one or more of the first LCD pixels activated to first clear on the first LCD (1321).

Example

Simple Dynamic 3D Display

FIG. 1 is representative of the simplest form of an electronic, dynamic auto-multiscopic 3D display. This example includes a transparent OLED display sandwiched between an opaque pinhole array parallax barrier and a concave mirror array. The transparent OLED display shows an array of images that each has a clear spot in its center that permits light reflected off the concave mirrors in the concave mirror array to exit the display system. The pinhole array parallax barrier is ideally black colored on both sides, and may be painted on to the transparent OLED display, integrated into the volume of the transparent OLED display, or located directly adjacent to it. In this example, the concave mirror array contains one concave mirror section for each pinhole in the pinhole array parallax barrier. The trough of each concave mirror bowl may optionally contain either a black, approximately pinhole-shaped spot that absorbs stray light, a hole through which missing image portions can be displayed by using a separate light emitting display, or a hole through which stray light can escape into a light-absorbing region of the display located beyond the inner surface of the concave mirror bowl.

Hybrid 2D/3D Displays

FIG. 16, FIG. 17 and FIG. 18 each show display systems in which a transparent OLED display (116) is sandwiched between a front LCD (1610) and a rear LCD (1615) from a viewer's perspective, with the rear LCD (1615) adjacent to a concave mirror (135). The front LCD (1610) and the rear LCD (1615) ideally have pixels that can be made either opaque black or clear, enabling them to form patterns on their surfaces that are either opaque, clear or have some opaque regions and some clear regions.

Each of these display systems has the flexibility to display 2D images, auto-multiscopic 3D images, or a combination of both 2D images and auto-multiscopic 3D images. However, only one configuration of each is shown in each figure for the purposes of illustration.

In FIG. 16, the front LCD (1610) is transparent, the transparent OLED display (116) is turned on, and the rear LCD (1615) is opaque, thus creating a 2D Mode display (1605) in which light (155) from the transparent OLED display (116) exits the front surface of the display system without being reflected off the concave mirror (135).

In FIG. 17, the front LCD (1610) forms a pinhole array parallax barrier (217), the transparent OLED display (116) is turned on, and the rear LCD (1615) is clear, thus creating a 3D Mode display (1705) in which light (155) exits the front surface (131) of the display system after being reflected off the concave mirror (135).

In FIG. 18, the front LCD (1610) forms a pinhole array parallax barrier (217), the transparent OLED display (116) is turned on, and the rear LCD (1615) is clear, thus creating a 3D Mode display (1805) in which light exits the front surface (131) of the display system after being reflected off the concave mirror (135). There is also a through-hole (605) in the concave mirror (135), through which a backlit LCD (1810) fills in the portion of the image that the transparent OLED display (116) is unable to display because of the clear spot (520), maintained on it to enable light (155) to exit the display system.

Figure 19:
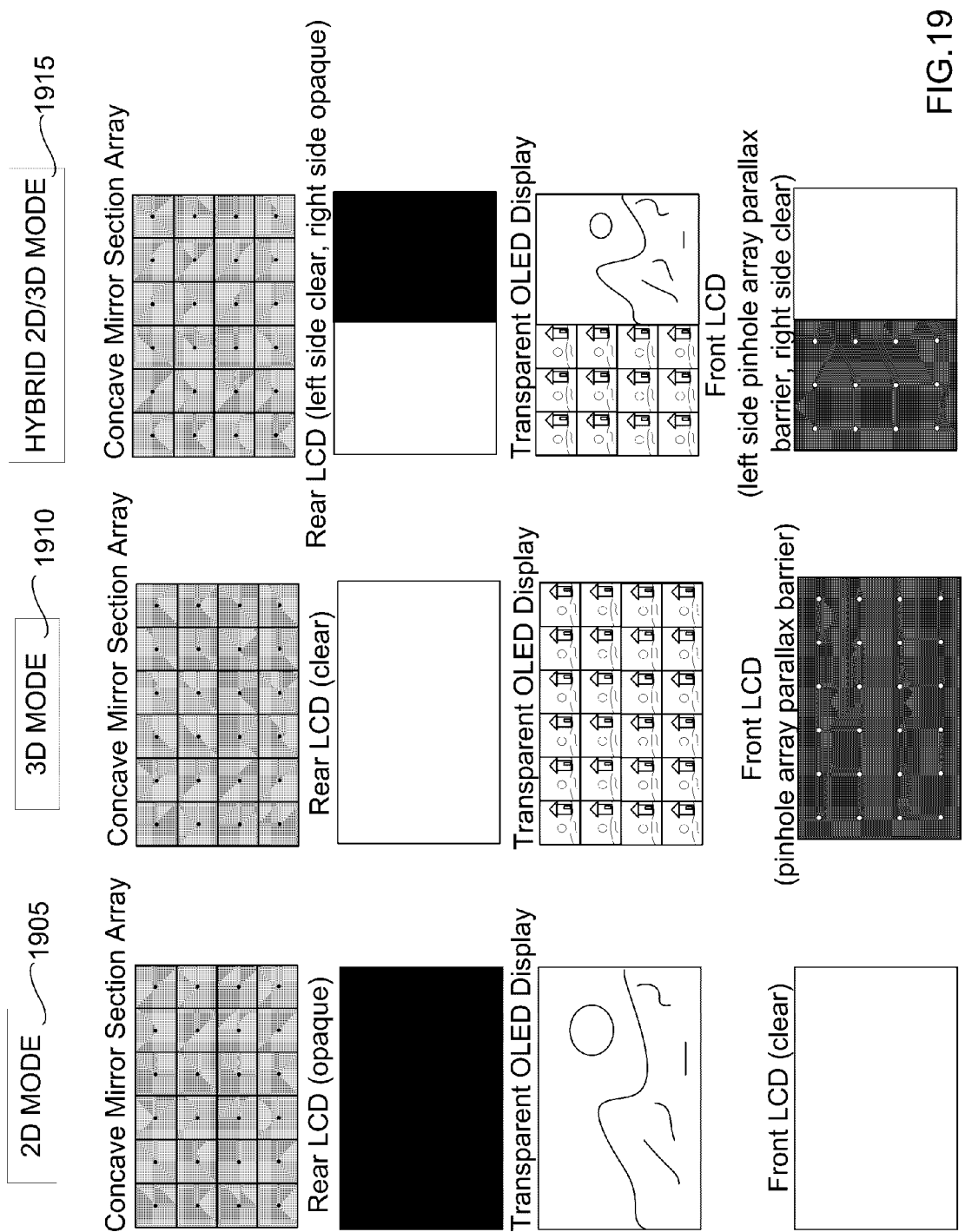
FIG. 19 is a comparison of the front views of each component removed from three display systems using 2 LCDs and one transparent OLED display, showing operable components vertically oriented to reflect their state for a 2D mode, a 3D mode and a hybrid 2D/3D mode.

FIG. 19 shows a hybrid 2D/3D display in which the transparent OLED display is sandwiched between 2 black/clear LCDs. It is relatively straightforward to show either 2D images in 2D Mode (1905) or 3D images in 3D Mode (1910) on this display, or to allocate certain regions of the display to 2D images and others to 3D images when the display is in Hybrid 2D/3D Mode (1915).

FIG. 20 illustrates a 3D mode display that includes a regular OLED display or a backlit LCD (2010). Starting at the top of this figure, the first box (2015) shows the regular OLED (or backlit LCD) showing missing image portions on a black background. The regular OLED (or backlit LCD) projects light into the through-hole at the top of each concave mirror in a concave mirror section array, designated by the second box (2020). Below the concave mirror section array is a transparent OLED display sandwiched between two LCDs. The third box (2025) shows the Rear LCD as being clear. The fourth box (2030) shows the transparent OLED display with an array of pictures, each containing a clear spot at the center of each picture. The bottom box (2035) shows the front face of the parallax barrier with an array of transparent spots, which in this case is identified as a pinhole array parallax barrier, and is created by the Front LCD.

Figure 21:
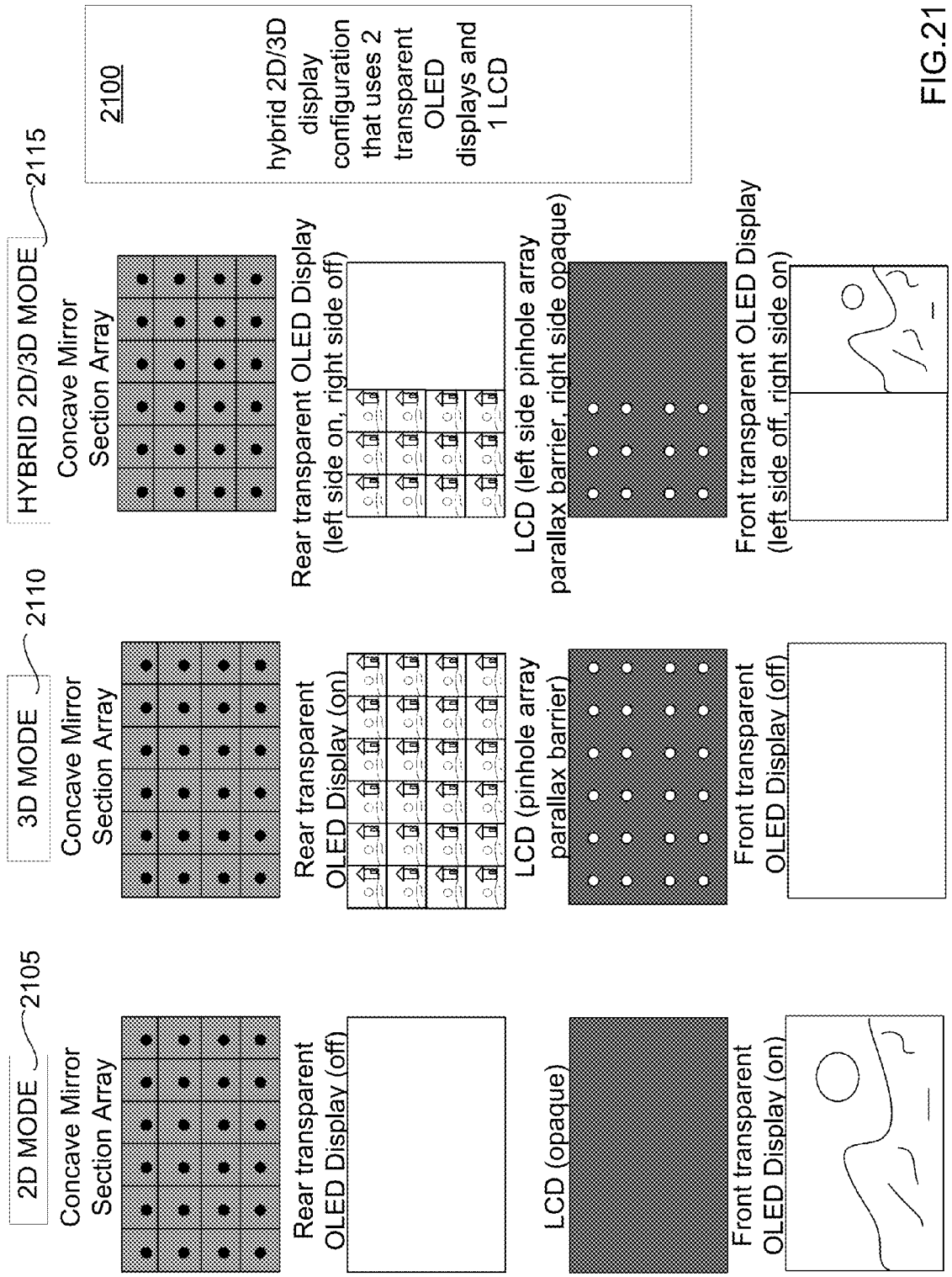
FIG. 21 is a comparison of the front views of each component removed from three display systems that use 2 transparent OLED displays and one LCD, showing operable components vertically oriented to reflect their state for a 2D mode, a 3D mode and a hybrid 2D/3D mode.

FIG. 21 illustrates a less than ideal hybrid 2D/3D display configuration in which 2 transparent OLED displays sandwich a liquid crystal display. This configuration is less than ideal because a transparent OLED display can emit light from both of its faces, so using 2 transparent OLED displays in a hybrid 2D/3D display will generally be redundant.

The left-most column of FIG. 21 illustrates a first 2D Mode (2105) of operation of this hybrid display configuration. The top un-numbered box of the left-most column of FIG. 21, signifying the rear of the display, is a concave mirror section array. Next in from the rear of the display is a Rear transparent OLED display set to off and thus activated to clear (although it may also be left on since it is blocked from the viewer's view in this configuration). Next in from the rear of the display is a liquid crystal display screen that is activated to all opaque black. And, at the front of the display is a Front transparent OLED display activated to show the desired 2D image (similar to a 2D image that would be shown on a standard television (TV)).

The central column of FIG. 21 illustrates a first 3D Mode (2110) of operation of this hybrid display configuration. The top un-numbered box of this central column of FIG. 21, signifying the rear of the display, is a concave mirror section array. Next in from the rear of the display is a Rear transparent OLED display set to on (and on which an array of images each with clear spots in their centers is displayed). Next in from the rear of the display is the LCD screen, which is configured to be operable as a pinhole array parallax barrier (in that it is activated to opaque black on all areas except an array of clear spots). And at the front of the display is a front transparent OLED display that is set to off, or which may also be described as being activated for transparency.

The right-most column of FIG. 21, illustrates a first Hybrid 2D/3D Mode (2115) of operation of this hybrid display configuration. The top un-numbered box of this rightmost column of FIG. 21, signifying the rear of the display, is a concave mirror section array. Next in from the rear of the display is a Rear transparent OLED display with the left side set to on (on which an array of images each with clear spots in their centers is displayed) and the right side set to off or clear. Next in from the rear of the display is a liquid crystal display, where the left side is configured to act as a pinhole array parallax barrier (which is colored black and contains an array of clear spots) and the right side is configured to be opaque black. And at the front of the display is a front transparent OLED display, where the left side is set to off (or activated to clear for transparency) and the right side is activated to display a 2D image (similar to a 2D image that would be shown on a standard TV).

As with all the embodiments, missing image portions may be filled in by using another light emitting display to project light through the through-holes in the concave mirrors in the concave mirror array.

It is possible with a display system of this type to display an auto-multiscopic 3-D image with the rear transparent OLED display while simultaneously displaying a 2D image with the front transparent OLED display, which could result in interesting visual effects. To accomplish this, the front transparent OLED display would display a 2D image with an array of clear spots in it, the rear transparent OLED display would display an array of 2D images each with a clear spot in its center (used to generate an overall auto-multiscopic 3D image) and the LCD between them would be configured as a pinhole array parallax barrier. Furthermore, the clear spots in both transparent OLED displays and the pinholes in the pinhole array parallax barrier would all be aligned with each other to enable light emitted by the rear transparent OLED display to exit the display system after being reflected off the concave mirror section array.

FIG. 22 illustrates a 3D mode of a static auto-multiscopic display, as indicated in the first rectangular box (2210). This display employs a transparent OLED display (2225) as a light source, which emits only white light and contains an array of clear spots.

The transparent OLED display (2225) is sandwiched in between a pinhole array parallax barrier (2230) and a film transparency sheet (2220) containing an array of images that each has a clear spot at its center. The pinholes in the pinhole array parallax barrier (2230) may be made with any suitable form including but not limited to transparent spots using a liquid crystal display, metal defining an actual array of pinholes, plastic with pinholes, opaque paint surrounding clear spots, etc.).

The transparent OLED display (2225) is used to illuminate a film transparency sheet (2220). This causes light emitted from the film transparency sheet to initially travel away from a viewer, after which this light is reflected off concave mirrors in the adjacent concave mirror section array (2215), which sends it through clear spots in the film transparency sheet and then through the pinholes in the pinhole array parallax barrier (2230) and into the space in front of the display.

Use of a transparent OLED display as a display lamp eliminates the need for a bulkier light box with an array of indentations to illuminate the film transparency sheet, enabling the front surface of the display to be smooth and flat. Once again, missing image portions in this configuration could be filled in by another light-emitting display.

FIG. 23 illustrates a Hybrid 2D/3D mode of a static display that uses film transparency sheets, as indicated in the first rectangular box (2310). This display employs a transparent OLED display (2325) as a light source, which emits only white light, and which can be configured to contain an array of clear spots over either some, all or no regions of its surface.

This transparent OLED display is sandwiched in between a rear film transparency sheet (2320), which contains one or more images that each has an optically clear spot at its center, and is otherwise clear (or alternately colored black, or the transparency sheet doesn't continue further), and a front film transparency sheet (2330), which contains a 2D image on part of its surface and is otherwise clear (or the transparency sheet doesn't continue further).

The images on the front and rear film transparency sheets are configured in this example so that no portions of images overlap each other from the perspective of a viewer looking head-on at the display.

A liquid crystal display (2335) at the front of the display may then be configured as either a pinhole array parallax barrier or a clear display, depending on whether 3D images comprised of auto-multiscopic pixels or regular 2D images, respectively, are intended to be shown on a particular part of the display. A pinhole array parallax barrier that covers part of the display may also be made of a permanent material such as metal, plastic or paint, or embedded within the volume of the transparent OLED display.

In operation of the display, the transparent OLED display is used to illuminate both film transparency sheets. The transparent OLED display shows white light with an array of clear spots in areas adjacent to source images for auto-multiscopic pixels on the rear film transparency sheet, and shows only white light (i.e. with no array of clear spots) in areas adjacent to regular 2D images on the front film transparency sheet.

This causes light emitted from the rear film transparency sheet to initially travel away from a viewer in regions of the display where the LCD pinhole array parallax barrier acts as the front of the display, after which this light is reflected off concave mirrors in the concave mirror section array (2315), and then back through clear spots in both film transparency sheets and then out of the pinholes in the pinhole array parallax barrier and into the space in front of the display. This results in the display of an auto-multiscopic 3D image on regions of the display where a pinhole array parallax barrier acts as the front of the display.

This also causes light emitted from the 2D image on the front film transparency sheet to travel towards a viewer by passing through adjacent regions of the LCD that are activated to clear, thus generating a standard 2D image. Adjacent to the rear film transparency sheet (2320), the figure illustrates a FIG. 23 concave mirror section array (2315).

FIG. 24 illustrates a "General Purpose Auto-Multiscopic Pixel" 2D/3D display, as indicated in the first rectangular box (2410). This display employs a transparent OLED display (2420) that is sandwiched between a FIG. 24 concave mirror section array (2415) and a pinhole array parallax barrier (2425).

This display generates both 2D and 3D images using the same set of auto-multiscopic pixel generating cells (which are termed "general purpose auto-multiscopic pixels" for this reason), simply by varying the degree of uniformity of the respective regions of pixels on the transparent OLED display that are used to generate individual auto-multiscopic pixels.

In operation of this display, the transparent OLED display is energized and made to display an array of color images, each with a clear spot at its center corresponding in size and shape to the similar spot in the pinhole array parallax barrier.

The colored light from the images on the transparent OLED display is emitted towards the concave mirror array, which reflects it back through the clear spots in the transparent OLED display, and thence through the transparent spots in the pinhole array parallax barrier and into the space in front of the display system.

When operating the display to show 2D images only (similar to the type of images that would be displayed on a regular television), all pixels used to generate an individual auto-multiscopic pixel are configured to be optically homogenous (i.e. sharing a uniform color). In other words, each auto-multiscopic pixel is used to display only one optically homogenous pixel that generally comprises part of a larger 2D image.

Conversely, when operating the display to show auto-multiscopic 3D images (or alternately to show different 2D images to viewers looking at the display from different vantage points in front of the display), some or all of the pixels used to generate an individual auto-multiscopic pixel are generally configured to be optically non-homogenous, thus generating a different appearance of the auto-multiscopic pixel depending on a viewer's location in front of the display. The "General Purpose Auto-Multiscopic Pixel" 2D/3D display may thus be operated by freely mixing these two methods (2420), without any need for additional LCD screens to function as spatial light modulators. This helps to give the overall display a very thin form factor.

FIG. 25 illustrates another type of "General Purpose Auto-Multiscopic Pixel" 2D/3D display, as indicated in the first rectangular box (2510). This display system employs a transparent OLED display (2525) that is sandwiched between a sheet of transparency film (2520) and a pinhole array parallax barrier that comprises the front of the display (2530). These display elements are all backed by a FIG. 25 concave mirror section array (2515). The display system generates both 2D and 3D images using the same set of auto-multiscopic pixel generating cells (which are termed "general purpose auto-multiscopic pixels" for this reason), simply by varying the degree of uniformity of the respective regions of pixels on the transparent OLED display that are used to generate individual auto-multiscopic pixels.

In operation of the display system, the transparent OLED display (2525) is energized and made to emit white light over its entire active surface except for an array of clear spots. Each such clear spot corresponds in size and shape to a similar spot in the pinhole array parallax barrier that it is located adjacent to.

The white light emitted by the transparent OLED display illuminates the sheet of transparency film, causing it to emit colored light. The sheet of transparency film in turn contains an array of images that each has an optically clear spot at its center, which is located adjacent to a corresponding clear spot in the transparent OLED display, and is of similar size. Each optically clear spot in the sheet of transparency film may also be a hole, as a hole is optically clear by nature.

Colored light emitted by the images on the film transparency sheet (when they are illuminated by the transparent OLED display) travels towards the concave mirror array, which reflects it through the clear spots in the transparent OLED display, and thence through the clear spots in the pinhole array parallax barrier and into the space in front of the display system.

When operating the display system to show 2D images only (similar to the types of 2D images that would be displayed on regular posters), all individual images on the sheet of transparency film that are used to generate an individual auto-multiscopic pixel are made to be optically homogenous (i.e. having a uniform color). In other words, each auto-multiscopic pixel is used to display only one optically homogenous pixel that generally comprises part of a larger 2D image.

Conversely, when operating the display system to show auto-multiscopic 3D images only (or alternately to show different 2D images to viewers looking at the display from different vantage points in front of the display), some or all of the individual images on the sheet of transparency film that are used to generate an individual auto-multiscopic pixel are generally made to be optically non-homogenous, thus generating a different appearance of the auto-multiscopic pixel depending on a viewer's location in front of the display.

This "General Purpose Auto-Multiscopic Pixel" 2D/3D display may thus be operated by freely mixing these two types of images on the sheet of transparency film (2520), which eliminates the need to use an additional sheet of transparency film and modify the pinhole array parallax barrier to achieve the same effect. This helps to give the overall display a very thin form factor.

Figure 26:
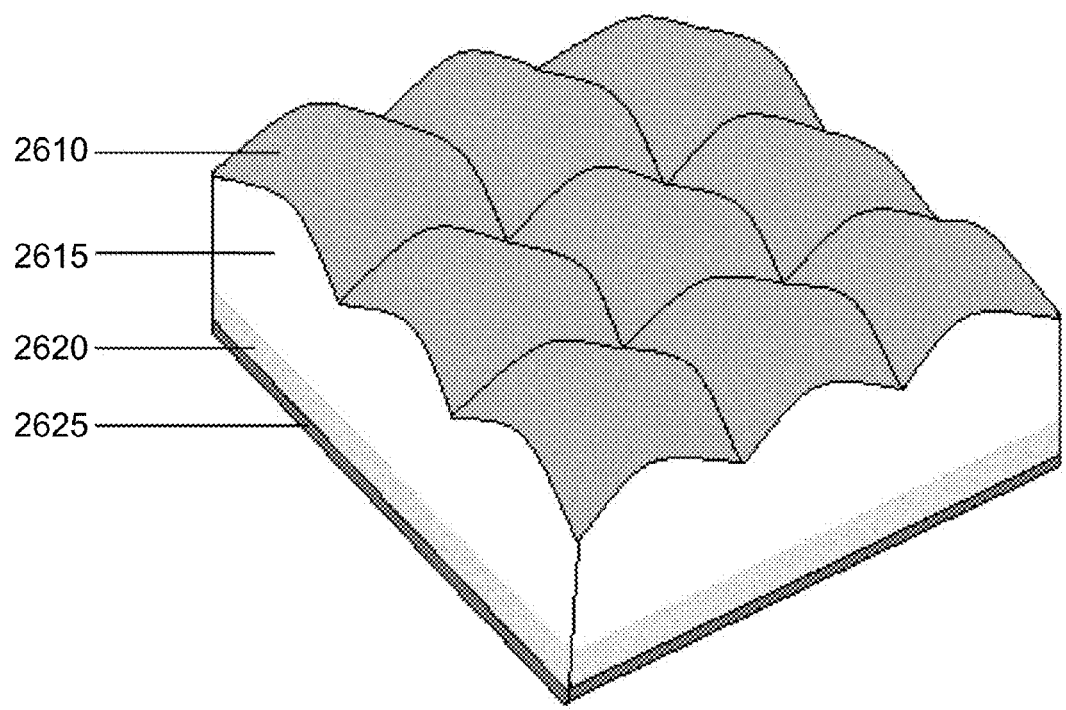
FIG. 26 is an illustration of the components of a display system that uses auto-multiscopic pixel generating cells exclusively.

FIG. 26 illustrates an advanced 2D/3D display that would ideally be used as a "General Purpose Auto-Multiscopic Pixel" 2D/3D display. It is operable with a pinhole array parallax barrier, a transparent OLED display that contains a rectangular array of concave mirror shaped glass bumps on its rear face from the perspective of a viewer, and a metal concave mirror array that is vacuum deposited onto the rear face of the transparent OLED display.

The FIG. 26 display may be tiled in an array with other similar displays until an overall display surface with the desired auto-multiscopic pixel resolution is achieved. The display is comprised of a transparent OLED display that contains a rectangular array of transparent glass bumps on the surface of its rear portion (2615) with respect to a viewer of the display.

Each of these glass bumps is formed to fit the inner reflecting surface of a square or rectangular section of a concave mirror, and to cover a precise grouping of pixels on the transparent OLED display, such as a 10×10 grouping of pixels, for example. This makes the rear surface of the transparent OLED display roughly similar to a rectangular micro-lens array in appearance.

A layer of highly reflective metal such as aluminum or silver is then vacuum deposited onto the rear surface of the transparent OLED display (which contains the glass bumps) to form a highly-reflective concave mirror array (2610) at a permanently fixed orientation with respect to the image generating portion of the transparent OLED display (2620).

This arrangement creates a so-called back silvered or second surface concave mirror array from the perspective of a viewer of the display. A pinhole array parallax barrier (2625) is then either painted (or deposited using some other method) onto the front surface of the transparent OLED display. The pinhole array parallax barrier may alternately be embedded within the volume of the transparent OLED display at very close proximity to the imaginary surface formed by the near faces of sub-pixels in the display.

This pinhole array parallax barrier has one pinhole for each concave mirror section in the highly-reflective concave mirror section array. Each pinhole in the pinhole array parallax barrier also corresponds to a precise grouping of pixels on the transparent OLED display, such as a 2×2 grouping of pixels, for example, and is ideally centered on the grouping of pixels covered by a respective concave mirror section that it corresponds to.

During operation of the FIG. 26 display, the transparent OLED display displays one image for each grouping of pixels covered by a concave mirror section. Each such image contains a clear grouping of pixels in its center that corresponds in size and shape and is located adjacent to a pinhole in the pinhole array parallax barrier that comprises the front surface of the display.

Light from each individual image on the transparent OLED display travels towards its respective concave mirror section in the concave mirror array, from where it is reflected back to the focal point of the concave mirror section. The focal point of each concave mirror section is located by design in or near the clear grouping of pixels at the center of the image that is adjacent to a pinhole in the pinhole array parallax barrier.

This light thus exits the display and moves into the space in front of the display by passing through the clear grouping of pixels in the image on the transparent OLED display (116), then through the adjacent pinhole in the pinhole array parallax barrier, and then out into the space in front of the display.

If desired, a through-hole (605) may be left in the trough of each concave mirror section (during vacuum deposition of the concave mirror section array). The through-hole (605) is aligned with the same clear grouping of pixels on the transparent OLED display that the pinhole in the pinhole array parallax barrier is located adjacent to, thus enabling a clear line of sight through the display system from the pinhole through the through-hole (605).

A second light emitting display may then be used to fill in the missing image portion on the transparent OLED display (116).

Alternately, the area on the surface of a glass bump left by such a through-hole may be painted black to make it non-reflecting and light absorbing, thus enabling it to absorb some of the stray light within an individual auto-multiscopic pixel generating cell. However, if the region of the display behind a concave mirror section is sufficiently light absorbing then this black paint may be omitted, as the light-absorbing region should help to absorb stray light from the corresponding auto-multiscopic pixel generating cell.

Additional optical techniques may also be used to further focus this light from the second light emitting display on or near the center of the clear grouping of pixels on the transparent OLED display (116) that is located adjacent to a pinhole in the parallax barrier (130).

Furthermore, it is also noted that it may be useful in practice to assign each pixel on a light emitting display that is used as a general purpose auto-multiscopic pixel 2D/3D display to a location in a 4-dimensional array (x,y,a,b) rather than a location in a standard 2-dimensional array (x,y).

In such an arrangement, the 2-dimensional locations of "general purpose auto-multiscopic pixels" on the display would be described by the x and y coordinates of the 4-dimensional (x,y,a,b) array, while the 2-dimensional locations of regular pixels within the respective arrays that generate respective auto-multiscopic pixels, such as a 10×10 array of regular pixels for example, would be described by the a and b coordinates of the (x,y,a,b) array.

For example, a regular pixel with location (100,200,3,4) would be located at location (3,4) in the array of regular pixels associated with the auto-multiscopic pixel at location (100,200) on a display system. Note that if an auto-multiscopic display system maintains a clear spot in the center of each regular pixel array used to generate an individual auto-multiscopic pixel, then some regular pixel locations on it may always be clear (or activated to clear) during its operation.

Assigning regular pixels to locations in this manner would enable auto-multiscopic images to retain their auto-multiscopic pixel array dimensions when being displayed on different auto-multiscopic display systems. However, if the 2-dimensional regular pixel arrays used to generate individual auto-multiscopic pixels have different resolutions on different display systems (e.g. 8×8 regular pixels versus 6×6 regular pixels), then image processing techniques will be needed to convert the images in these regular pixel arrays from one resolution to another, in order to facilitate their display on different auto-multiscopic display systems.

First Exemplary Display

This is an example of a screen display system designed to display dynamic auto-multiscopic 3D images using: a) a transparent OLED display, b) a black colored, non-transparent pinhole array parallax barrier, and c) a concave mirror array, all of which are enclosed by a display enclosing box. The screen display system is comprised of the following components:

Front wall of the display: The front wall of the display is a non-transparent, black colored, rectangular cuboid shaped parallax barrier measuring 16 1/16"×9 1/16"×1/32" on its large rectangular face. This front wall contains a 32×18 grid of pinholes (i.e. 576 total pinholes). The centers of these pinholes are spaced 1/2" apart along both the horizontal and vertical axes of the parallax barrier. Each pinhole is thus located at the center of a ½"×½" imaginary box on the surface of the pinhole array parallax barrier, with all such imaginary boxes adjacent to each other in a rectangular array format, and the entire rectangular array of imaginary boxes centered on the front wall of the display. Each pinhole is also a square that measures 1/16"×1/16". The front wall of the display thus somewhat resembles the surface of an air hockey table in structure (which also has a grid like array of holes in it).

Transparent OLED display: A rectangular cuboid-shaped transparent OLED display with dimensions 16 1/16"×9 1/16"×1/16" is located directly adjacent to the pinhole array parallax barrier, and behind the barrier from the perspective of a viewer.

The transparent OLED display is made to display a 32×18 array of color images, each of which images contains an optically clear spot at its center (where the transparent OLED display is largely kept off, or otherwise activated to clear, during operation of the display system in order to remain as clear as possible). These optically clear spots are aligned with the pinholes in the pinhole array parallax barrier, making the transparent OLED display comprise a continuation of the parallax barrier from the perspective of a viewer of the display.

An individual optically clear spot on the transparent OLED display may be slightly larger in dimensions than the corresponding hole in the pinhole array parallax barrier, to help prevent any stray light that may be emitted from within said clear spot on the transparent OLED display (i.e. within the volume of the transparent OLED display itself) from exiting the pinhole array parallax barrier.

A viewer looking at the pinhole array parallax barrier will not be able to directly see images on the transparent OLED display. Furthermore, the outer dimensions of each image displayed on the transparent OLED display will form a square that measures 7/16"×7/16".

Concave mirror enclosure array: A 32×18 grid of bowl shaped concave mirror sections is placed over the transparent OLED display so that the inside surfaces of the concave mirrors form domes directly over the disc shaped images on the transparent OLED display. The inner surfaces of the concave mirror sections are made of (or overlaid with) a highly reflective clear material such as polished silver, and have a concave mirror section whose rim is a 1/16"×1/16" black square painted in their centers, that helps to prevent stray light from being reflected out of the display.

The silhouette of each concave mirror section, from a viewpoint along an imaginary line running through the center of that section and perpendicular to the rear surface of the transparent OLED display, is a square of dimensions 7/16"×7/16", which matches the outer diameter of each image on the transparent OLED display. Black colored metal enclosure walls of 1/16" thickness extend from the edges of the concave mirror sections (which they are bound to) down to the corresponding images on the transparent OLED display, enabling the entire array of concave mirror sections and enclosures to be formed as one piece of metal with an overall silhouette measuring 16 1/16"×9 1/16" on its large rectangular face.

These enclosure walls surround the corresponding square images on the transparency sheet, providing opaque barriers between adjacent enclosures. Each concave mirror section is of the shape formed by applying an imaginary "cookie cutter" in the shape of the square enclosure walls to a concave mirror bowl, i.e. by moving the "cookie cutter" along the central axis of the bowl. Thus, the square enclosure walls are each slightly arched away from the plane of the rear wall at the edges where they make contact with the concave mirror sections, in order to form sealed edges with the corresponding edges of each concave mirror section.

The distance between each of the 4 corners of each concave mirror section that lies closest to the transparency sheet, and the transparency sheet itself, is 7/32" during operation of the display. The focus of each concave mirror is located in the center of the rim of each square enclosure, placing it on the corresponding clear square space in the transparent OLED display during operation of the display system, and also enabling light that is reflected off the concave mirror to pass through the clear spots in the transparent OLED display and subsequently exit the display system.

In operation of this exemplary display, the transparent OLED display is turned on, resulting in colored light largely filling the space between the transparent OLED display and the concave mirror array.

Display enclosing box: A 5-walled box tray, made of opaque material, has 1/16" wall thickness and measures 16 1/8"×9 1/8" in outer dimensions on its large rectangular face, and 16 1/16"×9 1/16" in inner dimensions on the same face. The 4 smaller rectangular faces of the box tray measure 5/8" in depth, which includes the 1/16" thickness of the large rectangular face.

Finally, the large rectangular face of the box tray has a 3" diameter circular opening in its center, that is used both for ventilation of the display and as a path for the wiring that leads to the transparent OLED display.

The box tray is used to enclose the concave mirror array, transparent OLED display and pinhole array parallax barrier, so that its closed large rectangular face lies behind the concave mirror enclosure array from the perspective of a viewer (leaving a spatial region with some clearance inside the display), and its rim edges lie flush with the edges of the pinhole array parallax barrier.

The front wall of the display is covered with a rectangular clear glass or plastic barrier measuring 16 1/8"×9 1/8"×1/16" to protect the display components from the elements. The edges of this clear glass or plastic barrier rest against the rim edges of the 5-walled opaque box tray. Other means may be used to ensure that the components of the display fit snugly together within the display enclosing box.

Second Exemplary Display

A second exemplary embodiment of the display system (100), intended to be able to display both 2D and 3D images, includes a transparent OLED display sandwiched between 2 LCDs that function as spatial light modulators, and a concave mirror array that is located behind the rear LCD from the perspective of a viewer. The LCDs may be of a simple kind with pixels that can be configured to be either black and opaque, or clear.

When operating the display system to show 2D images composed exclusively of regular pixels, the rear LCD is made opaque, the front LCD is made clear and the transparent OLED display is made to display a standard 2D image (such as would be displayed on a standard TV). In this case, the concave mirror array will be entirely hidden from a viewer of the display system, enabling the viewer to see standard dynamic 2D images.

Conversely, when operating the display system to show 3D (and/or 2D) images composed exclusively of auto-multiscopic pixels, the rear LCD is made clear, and the front LCD is made to display a rectangular array of clear spots surrounded by opaque black regions. In other words, the front LCD is made to function as a pinhole array parallax barrier.

The transparent OLED display is then energized and made to display a rectangular array of color images, each with a clear spot at its center corresponding in size and shape to the similar spot in the front LCD. Black and white images may also be displayed on the transparent OLED display.

There is a concave mirror (135) for each image in this rectangular array of images. Thus, there is a matching array of concave mirrors, preferably parabolic mirrors, each preferably having reflecting surfaces on the inside of each concave mirror (i.e. its concave side) so that each concave mirror reflects incoming light from the transparent OLED display to a focal point in or near one of the clear spots in the transparent OLED display.

When the transparent OLED display (116) is energized, colored light rays are preferably emitted away from the viewer (150) of the display. Light rays emitted away from the viewer (150) and perpendicular to the plane of the transparent OLED display then travel a short distance through the volume under the concave mirrors until they reach the inner surface of a respective concave mirror (which may be a parabolic mirror). At this point, the light (155) is reflected off the inside surface of that concave mirror (135), and redirected to the focal point of that concave mirror (135). The focal point of each concave mirror (135) is located at, or very near to, the respective clear spot in the transparent OLED display, which is in turn located adjacent to a respective clear spot in the front LCD that functions as a pinhole in a pinhole array parallax barrier. The light emerging from the pinhole then travels toward a viewer (150) at a distance in front of the display.

In operation of the display system, a large number of light rays are reflected from each concave mirror (135) and out through the front of the display by passing through the focal point of that concave mirror (135) and thus also through the pinhole centered near the focal point of that concave mirror (135). Since these light rays pass through focal points of the plurality of concave mirrors in the display, these focal points behave like light emitting points that are fixed in space, which are termed "auto-multiscopic pixels." Each auto-multiscopic pixel will thus emit a cone of light into the spatial region in front of the display, enabling multiple viewers to see 3D (or 2D) images on the display system simultaneously.

The display system may be made to simultaneously show 2D images composed of regular pixels and 3D (or 2D) images composed of auto-multiscopic pixels in adjacent regions by adjusting the images on the front LCD, rear LCD and transparent OLED display accordingly based on the above guidelines.

Third Exemplary Display

A third exemplary embodiment of the display system (100), intended to be able to display both 2D and 3D images, uses a 10×10 array of individual auto-multiscopic display systems to create a larger, ultra-high-resolution display-system.

Each individual display system in the array of display systems includes a transparent OLED display that is sandwiched between a pinhole array parallax barrier (that comprises the front of the display) and a concave mirror array (that is located behind the transparent OLED display from the perspective of a viewer). The transparent OLED display is a rectangular cuboid with dimensions 192 mm×108 mm×1 mm and a pixel resolution of 1920×1080. The pinhole array parallax barrier is a rectangular cuboid with dimensions 192 mm×108 mm×0.2 mm, containing a 192×108 array of square pinholes each measuring 0.2 mm×0.2 mm. The concave mirror array is a 192×108 grid of square concave mirror sections (with individual concave mirror sections not supported by enclosures) that covers 192 mm×108 mm on its large rectangular face. The concave mirror array is maintained by struts at a fixed separation from the transparent OLED display that enables light emitted by the transparent OLED display to be focused by the concave mirror array within clear spots on the transparent OLED display. Each concave mirror section in the concave mirror array covers a 10×10 cluster of pixels on the transparent OLED display.

Each 10×10 cluster of pixels on the transparent OLED display that is covered by a concave mirror section is configured to function as an individual "general purpose auto-multiscopic pixel" during operation of the display. This gives the display a resolution of 192×108 "general purpose auto-multiscopic pixels."

A 2×2 cluster of pixels (covering a 0.2 mm×0.2 mm area) in the center of each of these 10×10 clusters of pixels (covering a 1 mm×1 mm area) remains optically clear during operation of the display.

The 96 individual remaining pixels in each of these 10×10 clusters of pixels are generally configured to be optically homogenous (i.e. having identical colors to each other) when each "general purpose auto-multiscopic pixel" is used to display a singular regular pixel that comprises part of a standard 2D image (i.e. of the type that would be displayed on a regular TV). Conversely, some or all of the 96 individual remaining pixels in each of these 10×10 clusters of pixels are generally configured to be optically non-homogenous when the "general purpose auto-multiscopic pixel" is being used to display one auto-multiscopic pixel that comprises part of an auto-multiscopic 3D image. This enables both 2D and 3D images to share the same grid of "general purpose auto-multiscopic pixel" coordinates on the display, making the display very intuitive to use for both 2D and 3D display purposes, and also ensuring that light for both 2D and 3D images is emitted from the same imaginary display surface.

It is also noted that "general purpose auto-multiscopic pixels" may be used to simultaneously display different 2D images that appear to lie on the front surface of the display system to viewers in different locations in front of the display.

In operation of the display, the transparent OLED display is energized and made to display a 192×108 rectangular array of color images, each with a clear spot at its center corresponding in size and shape to the adjacent spot in the pinhole array parallax barrier. The colored light from the images on the transparent OLED display is emitted towards the concave mirror array, which reflects it back through the clear spots in the transparent OLED display, and thence through the transparent spots in the pinhole array parallax barrier and into the space in front of the display system.

Due to the large drop in screen resolution that an individual display experiences when 10×10 clusters of pixels on it are used to create "general purpose auto-multiscopic pixels," multiple displays of this type should ideally be tiled together to form a larger, higher resolution display system. Thus, in this example, a 10×10 array of 1920×1080 pixel resolution transparent OLED displays, each measuring 192 mm×108 mm on their large rectangular faces, and each backed by a 192×108 element concave mirror section array, with each concave mirror section covering a 10×10 pixel region on its respective transparent OLED display, would be used to form a tiled display system that has a "general purpose auto-multiscopic pixel" resolution of 1920×1080.

This 1920×1080 "general purpose auto-multiscopic pixel" resolution display system would thus actually consist of a 19200×10800 grid of actual pixels on the transparent OLED displays that comprise it. This larger tiled display system would have a front face measuring approximately 1.92 m×1.08 m when the individual displays that comprise it are tightly packed edge to edge. It would also have the ability to emit colored light from 199,065,600 regular pixels out of a total of 207,360,000 regular pixels. The remaining 8,294,400 pixels would remain optically clear during operation of the display system to enable light to exit the display system. The display system's individual "general purpose auto-multiscopic pixels" would also each be capable of displaying anywhere from 1 to 96 different views with the potential to be seen by viewers in front of the display system.

Fourth Exemplary Display

A fourth embodiment of the screen display system, intended to be able to display both 2D and 3D images, includes 2 transparent OLED displays that sandwich a liquid crystal display that functions as a spatial light modulator, and a concave mirror array that is located behind the far transparent OLED display from the perspective of a viewer.

Furthermore, each mirror in the concave mirror array contains a roughly pinhole-shaped hole at its trough. Behind the parabolic (aka, concave) mirror array from the perspective of a viewer is located a backlit LCD screen that is used solely to fill in missing portions of the images from the array of images on the transparent OLED display that are intended to generate an auto-multiscopic 3D effect. For example, if each individual image in the array of images is generated from a 7×7 pixel array with 1 optically clear pixel in its center, then this backlit LCD screen could be used to display this 1 missing pixel per image, which comprises only $\frac{1}{49}$th (or approximately 2%) of each image.

In this case, the need to fill in only 1 missing pixel per image makes it unnecessary to use additional lenses to further focus the light from the backlit LCD, which travels through the holes in the concave mirror array, on clear spots in the transparent OLED display.

When operating the display system to show 2D images composed of regular pixels only, the LCD screen is made entirely opaque, and only the front transparent OLED display is energized.

When operating the display system to show 3D (or 2D) images composed of auto-multiscopic pixels, the front transparent OLED display is turned off (making it optically clear), the LCD screen is made to function as a pinhole array parallax barrier, and the rear transparent OLED display is turned on along with the backlit LCD screen. In this case, the rear transparent OLED display displays one image with a clear spot in its center for each pinhole in the pinhole array parallax barrier. This configuration may also be used to display one or more 2D images on the display system simultaneously.

Fifth Exemplary Display

A fifth display example, intended to display static 3-dimensional and 2-dimensional images, includes a transparent OLED display sandwiched between a liquid crystal display that functions as a pinhole array parallax barrier (and also as the front wall of the display) and a sheet of color positive projection film.

There is an individual image on the sheet of projection film, with an optically clear spot at its center, for each pinhole in the pinhole array parallax barrier. The sheet of projection film is in turn located adjacent to a concave mirror array that is maintained at a fixed separation from the sheet of projection film. This enables the concave mirror array to focus light emitted by the sheet of projection film on the optically clear spots on the sheet of projection film. There is also one concave mirror section in the concave mirror array for each pinhole in the pinhole array parallax barrier.

In operation of the display, the transparent OLED display shows an array of white-light images with clear spots at their centers, each of which clear spots corresponds to a pinhole in the pinhole array parallax barrier. The white light from these images illuminates the corresponding images on the sheet of projection film, which in turn emit colored light.

Colored light rays emitted by the sheet of projection film, that initially travel away from a viewer of the display at angles perpendicular to the plane of the display, are then reflected off the inner surfaces of concave mirrors (which are preferably parabolic mirrors) in the concave mirror array, from where they travel through the clear spots in the transparent OLED display and then through the pinholes in the pinhole array parallax barrier and into the region of space in front of the display. It is also noted that the intensity of white light in various portions of the transparent OLED display may be varied over time to achieve simple visual effects, even though the images on the sheet of projection film are static. Furthermore, it is noted that a transparent OLED display may be used that emits light of a single color or colors other than white, to achieve other visual effects. Additionally, it is noted that the homogeneity of each static image on the sheet of projection film (that has an optically clear spot at its center) may be structured to achieve various types of 2D and 3D effects.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the television and theater industry.

What is claimed is:

1. A display system to enable auto-multiscopic three-dimensional viewing, the display system comprising:
   a parallax barrier defining a front surface of the display system, the parallax barrier being non-transparent except for an array of transparent spots thereon;
   a transparent Organic Light-Emitting Diode (OLED) display located behind the parallax barrier;
      the transparent OLED display comprising an array of pixels,
         the array of pixels comprises a plurality of pixels that are formed with a plurality of sub-pixels,
         the plurality of sub-pixels comprises sub-pixels configured for at least one of transparency, emission of red light, emission of green light, and emission of blue light, and
         wherein at least one sub-pixel configured for transparency is positioned behind each of the transparent spots in the array of transparent spots on the parallax barrier; and
   a concave mirror for each transparent spot in the array of transparent spots on the parallax barrier, each concave mirror located behind the transparent OLED display and centered on one transparent spot in the array of transparent spots on the parallax barrier, each concave mirror comprising a reflecting surface positioned so that light from the transparent OLED display is reflected off the concave mirror to then pass through the at least one sub-pixel configured for transparency in the transparent OLED display and then to pass through the transparent spot on the parallax barrier on which the concave mirror is centered so as to form an emission of light emanating from the one transparent spot on the parallax barrier.

2. The display system of claim 1, wherein each concave mirror is part of an enclosure that surrounds the one transparent spot on the parallax barrier over which said concave mirror is centered, the enclosure comprising non-transparent walls located between the transparent OLED display and the concave mirror.

3. The display system of claim 2, wherein the enclosure has a cross-sectional shape in a plane parallel to an imaginary plane that is tangent to the center of the transparent spot on the parallax barrier, the cross-sectional shape selected from the group consisting of circular, oval, hexagonal, rectangular and square.

4. The display system of claim 1, wherein each concave mirror comprises a non-reflecting, light absorbing material of approximately the same size and shape as the one transparent spot on the parallax barrier on which the concave mirror is centered, the non-reflecting, light absorbing material centered on the reflecting surface of the concave mirror at a point on the concave mirror marked by an imaginary line extending perpendicularly from an imaginary plane that is tangent to the center of the one transparent spot on the parallax barrier, the imaginary line passing through the center of the one transparent spot on the parallax barrier.

5. The display system of claim 1, wherein each concave mirror defines a through-hole through the concave mirror, the through-hole being approximately the same size and shape as the one transparent spot on the parallax barrier on which the concave mirror is centered, the through-hole centered at a point on the concave mirror marked by an imaginary line extending perpendicularly from an imaginary plane tangent to the center of the one transparent spot on the parallax barrier, the imaginary line passing through the center of the one transparent spot on the parallax barrier.

6. The display system of claim 5, further comprising a light-emitting display behind each concave mirror, wherein the light-emitting display is positioned to project light through the through-hole, so that said light may then pass through at least one sub-pixel configured for transparency in the transparent OLED display, and may then pass through the transparent spot on the parallax barrier behind which said at least one sub-pixel is positioned.

7. The display system of claim 5, further comprising a convex lens positioned below the through-hole in each concave mirror so that light from the light-emitting display is approximately focused on the one transparent spot on the parallax barrier.

8. The display system of claim 1, further comprising a second lens for each transparent spot in the array of transparent spots on the parallax barrier, each such second lens positioned adjacent to the front surface of the parallax barrier.

9. A display system that is auto-multiscopic to enable three-dimensional viewing, the display system comprising:
a parallax barrier defining a front surface of the display system, the parallax barrier being non-transparent except for an array of transparent spots thereon;
a transparent Organic Light-Emitting Diode (OLED) display located behind the parallax barrier, the transparent OLED display comprising an array of pixels that emit only light of a white color in a direction away from the parallax barrier, except no light is emitted from the display system at positions behind each of the transparent spots in the array of transparent spots on the parallax barrier;
a sheet of projection film on which is printed a grid-like array of images, the sheet of projection film being positioned behind the transparent OLED display, wherein each image in the grid-like array of images has a dot that is optically clear and centrally located on the image, said dot being centered on one transparent spot in the array of transparent spots on the parallax barrier, each said dot being approximately the same size and shape as the one transparent spot on which it is centered; and
a concave mirror for each transparent spot in the array of transparent spots on the parallax barrier, each concave mirror located behind the sheet of projection film and centered on one dot on the sheet of projection film, each concave mirror positioned so that light from the transparent OLED display passes through each image on the sheet of projection film and is then reflected off the concave mirror and then passes through the dot on the sheet of projection film on which the concave mirror is centered and then through the one transparent spot on the parallax barrier so as to form an emission of light emanating from the one transparent spot on the parallax barrier.

10. A display system that is auto-multiscopic to enable two-dimensional and three-dimensional viewing using at least a first Liquid Crystal Display (LCD), a second LCD, and an Organic Light Emitting Diode (OLED) display, the display system comprising:
a first LCD forming an outer wall facing a viewer and an inner wall opposite the outer wall, the first LCD comprising first LCD pixels that may be activated to one of first-opaque black and first clear to the viewer looking at the outer wall;
a transparent OLED display adjacent to the inner wall of the first LCD;
the transparent OLED display comprising an array of pixels,
the array of pixels comprises a plurality of pixels that are formed with a plurality of sub-pixels,
the plurality of sub-pixels comprises sub-pixels configured for at least one of transparency, emission of red light, emission of green light, and emission of blue light,
wherein at least one sub-pixel in the plurality of sub-pixels that is configured for transparency is positioned behind one or more of the first LCD pixels in the first LCD that may be activated to first clear;
a second LCD adjacent to the transparent OLED display so as to sandwich the transparent OLED display between the second LCD and the first LCD;
the second LCD comprising second LCD pixels that are configured to be activated to one of second-opaque black and second-clear;
wherein one or more of the second LCD pixels that is configured to be activated to second-clear is adjacent to at least one sub-pixel in the plurality of sub-pixels that is configured for transparency in the transparent OLED display;

a concave mirror for each alignment of:
- the second LCD pixels configured to be activated to second-clear,
- the at least one sub-pixel in the plurality of sub-pixels that is configured for transparency in the transparent OLED display, and
- the first LCD pixels in the first LCD that may be activated to first clear;

each concave mirror located behind the second LCD and centered on each said alignment; and each concave mirror positioned so that light directed towards it from the transparent OLED display, said light passing through the second LCD, is then reflected off the concave mirror to then pass through the alignment on which the concave mirror is centered and enable an emission of the light toward the viewer.

11. The display system of claim 10, wherein each concave mirror defines a through-hole at its center, the display system further comprising:
- a light-emitting display positioned beyond the concave mirror; and
- wherein the light-emitting display is positioned to project light through the through-hole, then through one or more second LCD pixels activated to second-clear, then through the at least one sub-pixel configured for transparency in the transparent OLED display, and then through one or more of the first LCD pixels activated to be first clear on the first LCD.

* * * * *